(12) United States Patent
Sugano et al.

(10) Patent No.: US 12,250,489 B2
(45) Date of Patent: Mar. 11, 2025

(54) INFORMATION PROCESSING DEVICE AND METHOD FOR GENERATING COMPOSITE VIDEO

(71) Applicant: SONY GROUP CORPORATION, Tokyo (JP)

(72) Inventors: Hisako Sugano, Tokyo (JP); Yoichi Hirota, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 21 days.

(21) Appl. No.: 17/996,578

(22) PCT Filed: Apr. 14, 2021

(86) PCT No.: PCT/JP2021/015392
§ 371 (c)(1),
(2) Date: Oct. 19, 2022

(87) PCT Pub. No.: WO2021/220804
PCT Pub. Date: Nov. 4, 2021

(65) Prior Publication Data
US 2023/0224428 A1 Jul. 13, 2023

(30) Foreign Application Priority Data
Apr. 27, 2020 (JP) ................. 2020-078383

(51) Int. Cl.
*H04N 5/262* (2006.01)
*G06T 7/20* (2017.01)
(Continued)

(52) U.S. Cl.
CPC ............. *H04N 5/2621* (2013.01); *G06T 7/20* (2013.01); *G06T 7/70* (2017.01); *G06V 10/25* (2022.01);
(Continued)

(58) Field of Classification Search
CPC ........... G06T 7/20; G06T 7/70; G06V 10/147; G06V 10/25; G06V 10/60; G06V 10/761;
(Continued)

(56) References Cited

U.S. PATENT DOCUMENTS

2012/0169902 A1* 7/2012 Matsuzawa ............ H04N 23/61
348/333.04
2015/0220777 A1* 8/2015 Kauffmann ............ G06V 40/10
382/103
(Continued)

FOREIGN PATENT DOCUMENTS

CN 109983753 A 7/2019
CN 110023953 A 7/2019
(Continued)

OTHER PUBLICATIONS

International Search Report and Written Opinion of PCT Application No. PCT/JP2021/015392, issued on Jul. 6, 2021, 09 pages of ISRWO.

*Primary Examiner* — Amy R Hsu
(74) *Attorney, Agent, or Firm* — CHIP LAW GROUP

(57) ABSTRACT

There is provided a subject emphasizing device that includes a visible-light moving image acquisition unit that acquires a moving image including a subject and a background, and a subject region extraction unit that extracts a region of the subject from the moving image. Then, a background drawing unit draws background information, in a region other than the region of the subject in the moving image. An effect application unit applies a visual effect to the region of the subject, based on an intensity of the visual effect determined by an effect intensity calculation unit according to a distance from a camera to the subject. A video compositing unit combines the region of the subject to which the visual effect has been applied by the effect application unit with the
(Continued)

background information drawn by the background drawing unit, generating a composite video.

13 Claims, 18 Drawing Sheets

(51) Int. Cl.
    *G06T 7/70*            (2017.01)
    *G06V 10/25*         (2022.01)
    *G06V 10/60*         (2022.01)
    *G06V 10/74*         (2022.01)
    *H04N 5/272*        (2006.01)
    *H04N 23/11*        (2023.01)

(52) U.S. Cl.
    CPC ............ *G06V 10/60* (2022.01); *G06V 10/761* (2022.01); *H04N 5/272* (2013.01); *H04N 23/11* (2023.01)

(58) Field of Classification Search
    CPC ........ H04N 23/00; H04N 23/11; H04N 23/60; H04N 5/222; H04N 5/262; H04N 5/2621; H04N 5/265; H04N 5/272; H04N 5/2723
    See application file for complete search history.

(56) References Cited

U.S. PATENT DOCUMENTS

2019/0080498 A1*   3/2019   Horie ................... G06T 3/4053
2019/0272658 A1*   9/2019   Takahashi .......... H04N 1/32128

FOREIGN PATENT DOCUMENTS

| | | |
|---|---|---|
| JP | 2000-023038 A | 1/2000 |
| JP | 2003-111094 A | 4/2003 |
| JP | 2012175316 A | 9/2012 |
| JP | 2015-211338 A | 11/2015 |
| JP | 2017118441 A | 6/2017 |
| WO | 2018/096775 A1 | 5/2018 |
| WO | 2019/230225 A1 | 12/2019 |

\* cited by examiner

FIG.11
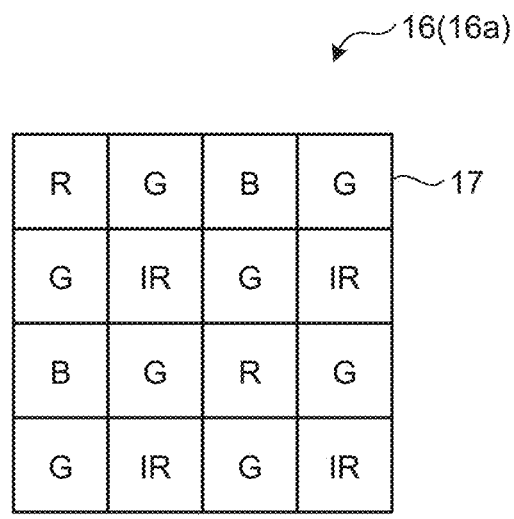
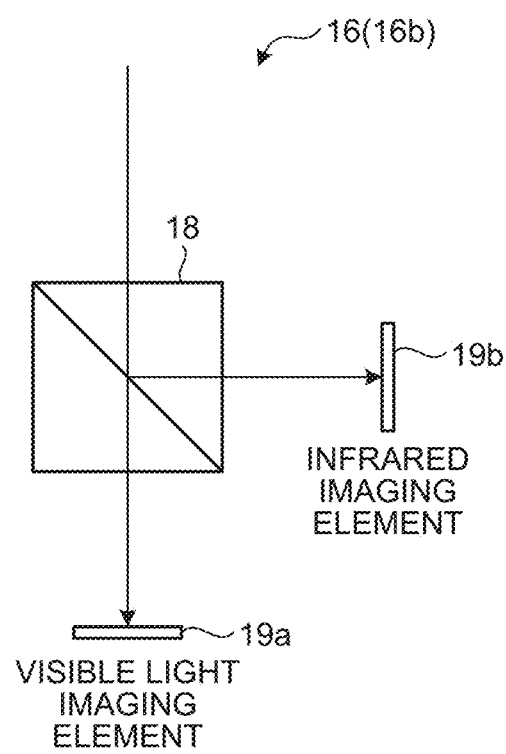

INFORMATION PROCESSING DEVICE AND METHOD FOR GENERATING COMPOSITE VIDEO

CROSS REFERENCE TO RELATED APPLICATIONS

This application is a U.S. National Phase of International Patent Application No. PCT/JP2021/015392 filed on Apr. 14, 2021, which claims priority benefit of Japanese Patent Application No. JP 2020-078383 filed in the Japan Patent Office on Apr. 27, 2020. Each of the above-referenced applications is hereby incorporated herein by reference in its entirety.

FIELD

The present disclosure relates to an information processing device, a composite video generation method, and a program.

BACKGROUND

A conventional chroma key compositing is known to combine a portion of a video having a specific color component and made transparent with another video. Specifically, shooting is performed in a studio in which a green back screen is installed, and a region having a color other than the green is determined as a foreground (e.g., a subject) and extracted.

However, it has been difficult to install the green back screens on stages at concert venues. In addition, it is difficult to extract the foregrounds at the live venues, because light environments are drastically changed due to spotlights, fireworks, laser beams, and the like for direction.

Against such a problem, for example, Patent Literature 1 proposes a technology for foreground extraction using infrared ray.

CITATION LIST

Patent Literature

Patent Literature 1: JP 2000-23038 A

SUMMARY

Technical Problem

However, in Patent Literature 1, it is described to combine the extracted foreground with any background but is not described to combine the foreground to which an effect is being applied in real time, with the background to increase visual effects.

The present disclosure proposes an information processing device, a composite video generation method, and a program that are configured to apply an effect to an extracted foreground with any background, in real time.

Solution to Problem

To solve the problems described above, an information processing device according to an embodiment of the present disclosure includes: a first acquisition unit that acquires a moving image including a subject and a background; a subject region extraction unit that extracts a region of the subject from the moving image acquired by the first acquisition unit; a background drawing unit that draws background information in a region other than the region of the subject in the moving image acquired by the first acquisition unit; an effect application unit that applies an effect to the region of the subject, based on an intensity of the effect applied to the region of the subject determined according to information about an environment of acquiring the moving image; and a video compositing unit that generates a composite video in which the region of the subject on which the effect has been applied by the effect application unit is combined with the background information drawn by the background drawing unit.

BRIEF DESCRIPTION OF DRAWINGS

FIG. 11 is a diagram illustrating a schematic structure of an RGB-IR camera.

DESCRIPTION OF EMBODIMENTS

Figure 1:
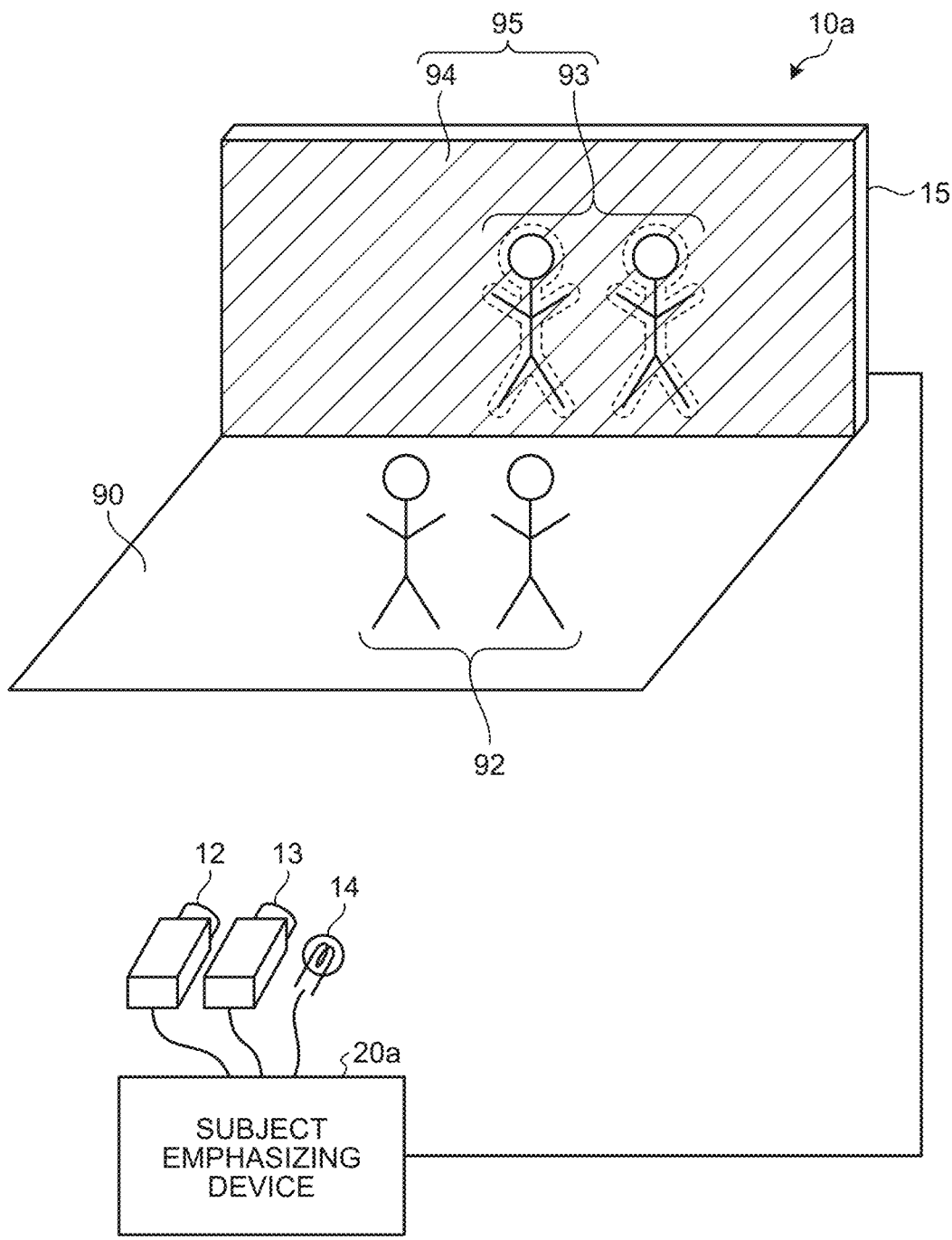
FIG. 1 is a block diagram illustrating a schematic configuration of a subject emphasizing system according to a first embodiment.

Embodiments of the present disclosure will be described below in detail with reference to the drawings. Note that in the following embodiments, the same portions are denoted by the same reference numerals and symbols, and a repetitive description thereof will be omitted.

Furthermore, the present disclosure will be described in the order of items shown below.
1. First Embodiment
   1-1. Configuration of subject emphasizing system
   1-2. Hardware configuration of subject emphasizing system
   1-3. Functional configuration of subject emphasizing device
   1-4. Description of subject region extraction process
   1-5. Description of visual effects
   1-6. Calculation of effect intensity
   1-7. Procedure of processing performed by subject emphasizing device
   1-8. Effects of first embodiment
   1-9. Modification of First Embodiment
   1-10. Effects of modification of first embodiment
2. Second Embodiment
   2-1. Functional configuration of subject emphasizing device
   2-2. Description of subject region extraction process
   2-3. Calculation of effect intensity
   2-4. Procedure of processing performed by subject emphasizing device
   2-5. Effects of second embodiment
   2-6. Modifications of Second Embodiment
   2-7. Effects of modifications of second embodiment
3. Third Embodiment
   3-1. Functional configuration of subject emphasizing device
   3-2. Procedure of processing performed by subject emphasizing device
   3-3. Effects of third embodiment

1. First Embodiment

[1-1. Configuration of Subject Emphasizing System]

First, an overview of a subject emphasizing system 10*a* to which the present disclosure is applied will be described with reference to FIG. 1. FIG. 1 is a block diagram illustrating a schematic configuration of the subject emphasizing system according to a first embodiment.

As illustrated in FIG. 1, the subject emphasizing system 10*a* includes an RGB camera 12, an IR camera 13, an IR light 14, a subject emphasizing device 20*a*, and an LED panel 15.

The subject emphasizing system 10*a* extracts a subject that is captured by the RGB camera 12, from a background. Then, a visual effect is applied to a region of the subject extracted and then the extracted region of the subject is combined with the original background or another background. Note that, in the present disclosure, the region of the subject may represent the entire subject or part of the subject. For example, a region excluding part of the body of the subject (such as toes and hair) may be defined as the region of the subject. Furthermore, the visual effect is an example of an effect in the present disclosure.

The RGB camera 12 is a camera that captures a subject 92 on a stage 90. The RGB camera 12 is sensitive to visible light.

The IR camera 13 is an infrared camera that captures a range substantially equal to that of the RGB camera 12 and that is sensitive to infrared rays (e.g., a wavelength range of 800 to 900 nm) as invisible light. The IR camera 13 captures the subject 92 on the stage 90. Note that a relative positional relationship between the RGB camera 12 and the IR camera 13 is acquired by performing calibration in advance.

The IR light 14 is an infrared light that illuminates a shooting range of the IR camera 13. Note that the IR light 14 has an emission wavelength, light of which includes a large amount of light in a wavelength region to which the IR camera 13 is sensitive. The IR light 14 includes, for example, an infrared light emitting diode (LED) having an emission wavelength of approximately 800 to 900 nm.

The subject emphasizing device 20*a* extracts the region of each subject 92 from each of a video captured by the RGB camera 12 and a video captured by the IR camera 13. Furthermore, the subject emphasizing device 20*a* applies the visual effect to the extracted region of the subject 92. Furthermore, the subject emphasizing device 20*a* combines the region of the subject 92 to which the visual effect is applied with a region (background) other than the region of the subject 92 in the video captured by the RGB camera 12, and generates a composite video. Here, the background may directly use the region other than the subject 92 in the video captured by the RGB camera 12, or may use the region to which other information is applied. Note that the subject emphasizing device 20*a* is an example of an information processing device in the present disclosure.

The LED panel 15 is a display panel that is installed at the back of the stage 90, that is, behind the subject 92 and on which a plurality of LEDs is vertically and horizontally aligned. The LED panel 15 displays a composite video 95 that is output from the subject emphasizing device 20*a*. In the composite video 95, a subject 93 to which the visual effect has been applied are combined with background information 94 that is applied to the region other than the region of the subject 92 in the video captured by the RGB camera 12. This configuration makes it possible for audience viewing the stage 90 to view both of the performance of the subject 92 and the composite video 95 including the subject 93 to which the visual effect is applied, displayed on the LED panel 15. Note that the LED panel 15 has a surface with a low reflectance, suppressing reflection of illumination light from the IR light 14 and illumination light illuminating the stage 90. This configuration makes it possible to enhance the visibility of the composite video 95 displayed on the LED panel 15. Thus, this configuration makes it possible for the audience to view the subject 92 on the stage 90 and the composite video 95 displayed on the LED panel 15 at the same time, increasing stage effect.

Note that the subject emphasizing device 20*a* may transmit the composite video 95 to another place different from the stage 90. This configuration makes it possible to view the composite video 95 in real time at the another place.

[1-2. Hardware Configuration of Subject Emphasizing System]

Figure 2:
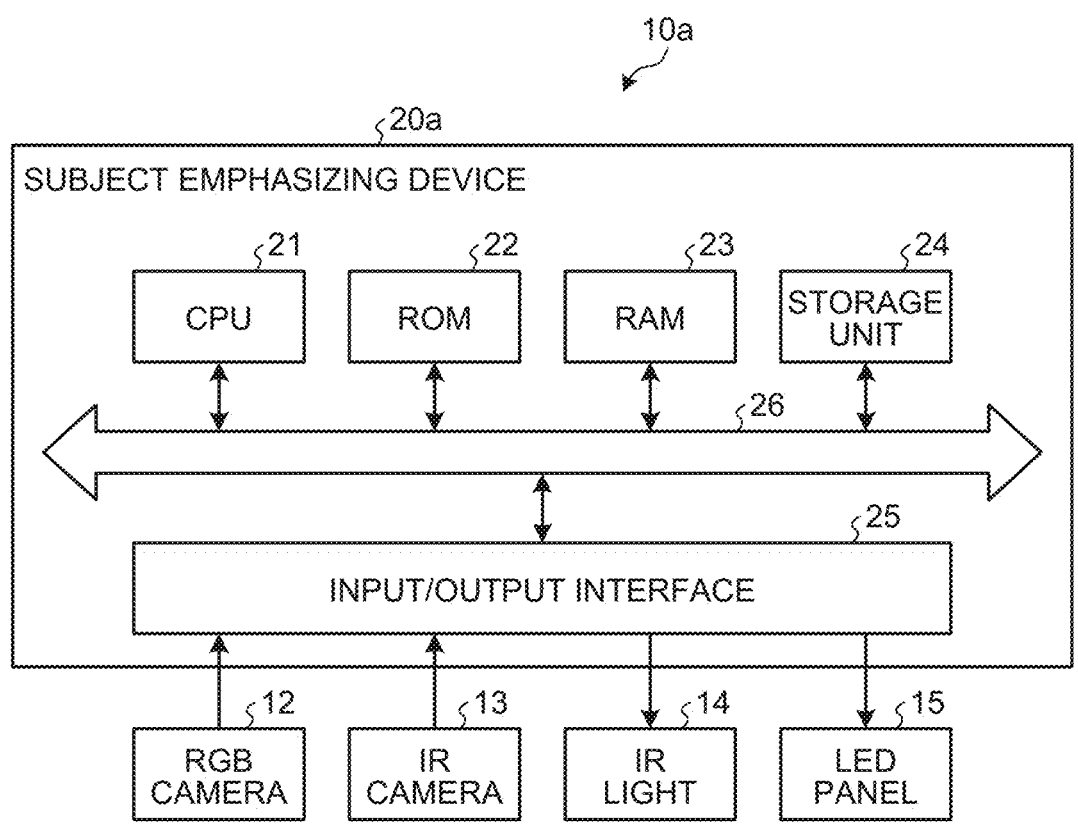
FIG. 2 is a hardware block diagram illustrating an example of a hardware configuration of the subject emphasizing system.

Next, a hardware configuration of the subject emphasizing system 10*a* will be described with reference to FIG. 2. FIG. 2 is a hardware block diagram illustrating an example of the hardware configuration of the subject emphasizing system.

The subject emphasizing system 10*a* includes a central processing unit (CPU) 21, a read only memory (ROM) 22, a random access memory (RAM) 23, a storage unit 24, and an input/output controller 25 that are connected to each other via an internal bus 26.

A control program stored in the storage unit 24 and various data files stored in the ROM 22 are loaded on the RAM 23 and executed by the CPU 21, and thus, the entire operation of the subject emphasizing system 10*a* is controlled. In other words, the subject emphasizing system 10*a* has a configuration of a general computer that is operated by the control program. Note that the control program may be provided via a wired or wireless transmission medium such as a local area network, the Internet, or digital satellite broadcast. Furthermore, in the subject emphasizing system 10*a*, a series of processing steps may be performed by hardware. Note that the control program executed by the CPU 21 may be a program in which processing is performed in time series in an order as described in the present disclosure, or may be a program in which processing is performed parallelly or with necessary timing such as when called.

The storage unit 24 includes, for example, a flash memory, and stores the control program and the like executed by the CPU 21.

The input/output controller 25 connects the CPU 21 and various input/output devices to input/output information.

The functions of the RGB camera 12, the IR camera 13, the IR light 14, and the LED panel 15, which are input/output devices connected to the input/output controller 25, are as described above. Note that to the input/output controller 25, an input device, such as a keyboard, by which an operator gives an operation instruction to the subject emphasizing device 20*a*, a monitor device that monitors the state of the subject emphasizing device 20*a*, and a communication device that transmits the composite video 95 output by the subject emphasizing device 20*a* to the outside, as necessary.

[1-3. Functional Configuration of Subject Emphasizing Device]

Figure 3:
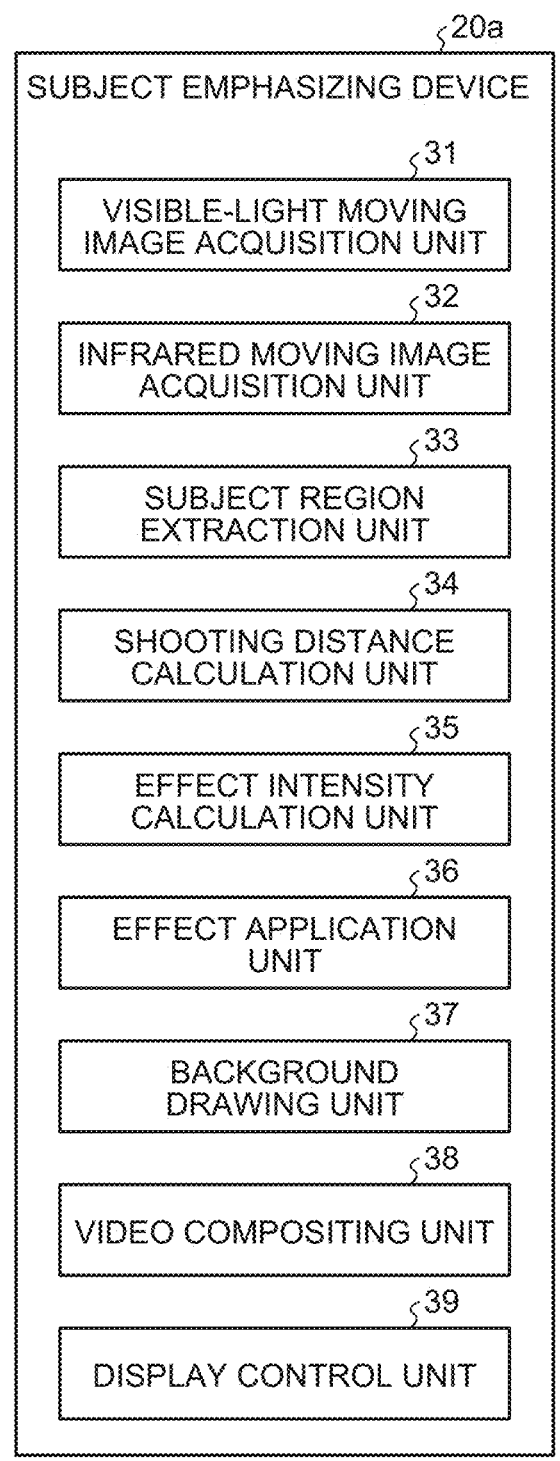
FIG. 3 is a functional block diagram illustrating an example of a functional configuration of a subject emphasizing device according to the first embodiment.

Next, a functional configuration of the subject emphasizing device 20*a* will be described with reference to FIG. 3. FIG. 3 is a functional block diagram illustrating an example of the functional configuration of the subject emphasizing device according to the first embodiment. The CPU 21 of the subject emphasizing device 20*a* loads the control program on the RAM 23 and runs the control program to implement the respective functional units illustrated in FIG. 3.

In other words, the CPU 21 of the subject emphasizing device 20*a* implements, as the functional units, a visible-light moving image acquisition unit 31, an infrared moving image acquisition unit 32, a subject region extraction unit 33, a shooting distance calculation unit 34, an effect intensity calculation unit 35, an effect application unit 36, a background drawing unit 37, a video compositing unit 38, and a display control unit 39.

The visible-light moving image acquisition unit 31 acquires a video signal captured by the RGB camera 12 to acquire an RGB video (moving image) including the subject 92 and the background. Note that the visible-light moving image acquisition unit 31 is an example of a first acquisition unit in the present disclosure.

The infrared moving image acquisition unit 32 acquires a video signal captured by the IR camera 13 in synchronization with the timing at which the visible-light moving image acquisition unit 31 acquires the moving image, with timing of turning on the IR light 14, thereby acquiring an IR video (moving image) including the subject 92 and the background. Note that the infrared moving image acquisition unit 32 is an example of a second acquisition unit in the present disclosure.

The subject region extraction unit 33 extracts the region of the subject 92 from the RGB video acquired by the visible-light moving image acquisition unit 31.

The shooting distance calculation unit 34 calculates a shooting distance when capturing the IR video acquired by the infrared moving image acquisition unit 32, that is, a distance from the IR camera 13 to the subject 92. Note that the shooting distance calculation unit 34 may calculate a distance from the RGB camera 12 to the subject 92. The shooting distance is an example of environment of acquiring the moving image, in the present disclosure.

The effect intensity calculation unit 35 calculates the intensity of the visual effect applied to the region of the subject 92 extracted by the subject region extraction unit 33 from the RGB video acquired by the visible-light moving image acquisition unit 31, according to information about environment of acquiring the RGB video acquired by the visible-light moving image acquisition unit 31.

The effect application unit 36 applies the visual effect to the region of the subject 92, on the basis of the intensity calculated by the effect intensity calculation unit 35 to the region of the subject 92 extracted by the subject region extraction unit 33.

The background drawing unit 37 draws the background information 94 in the region other than the region of the subject 92, in the RGB video acquired by the visible-light moving image acquisition unit 31. The background information 94 may be a live-action video or a computer graphics (CG) video. Furthermore, an image may be used instead of the video. Furthermore, a plurality of pieces of background information 94 may be applied and drawn to half regions of the background obtained by, for example, being vertically divided, horizontally divided, or obliquely divided.

The video compositing unit 38 generates the composite video 95 in which the region of the subject 92 to which the visual effect has been applied by the effect application unit 36 is combined with the background information 94 drawn by the background drawing unit 37.

The display control unit 39 causes the LED panel 15 to display the composite video 95 generated by the video compositing unit 38. Note that the display control unit 39 is an example of an image display unit in the present disclosure.

[1-4. Description of Subject Region Extraction Process]

Figure 4:
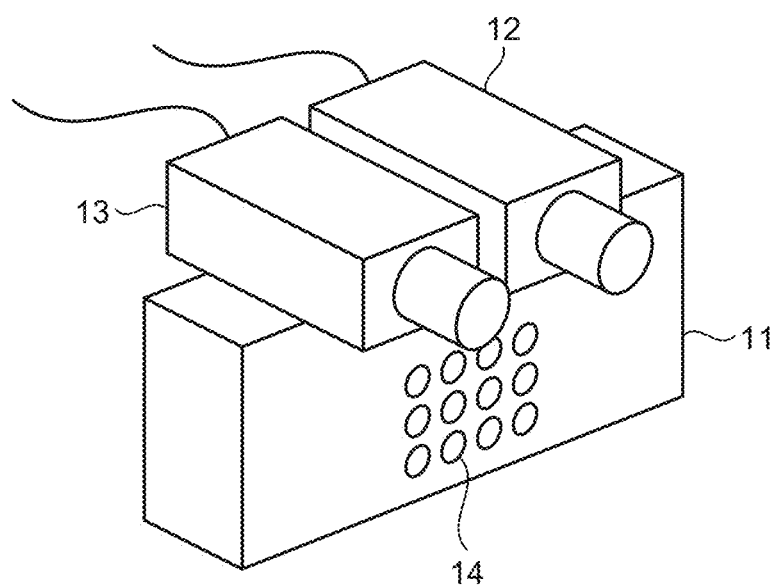
FIG. 4 is an exemplary external view of an installation state of an RGB camera, an IR camera, and an IR light.
Figure 5:
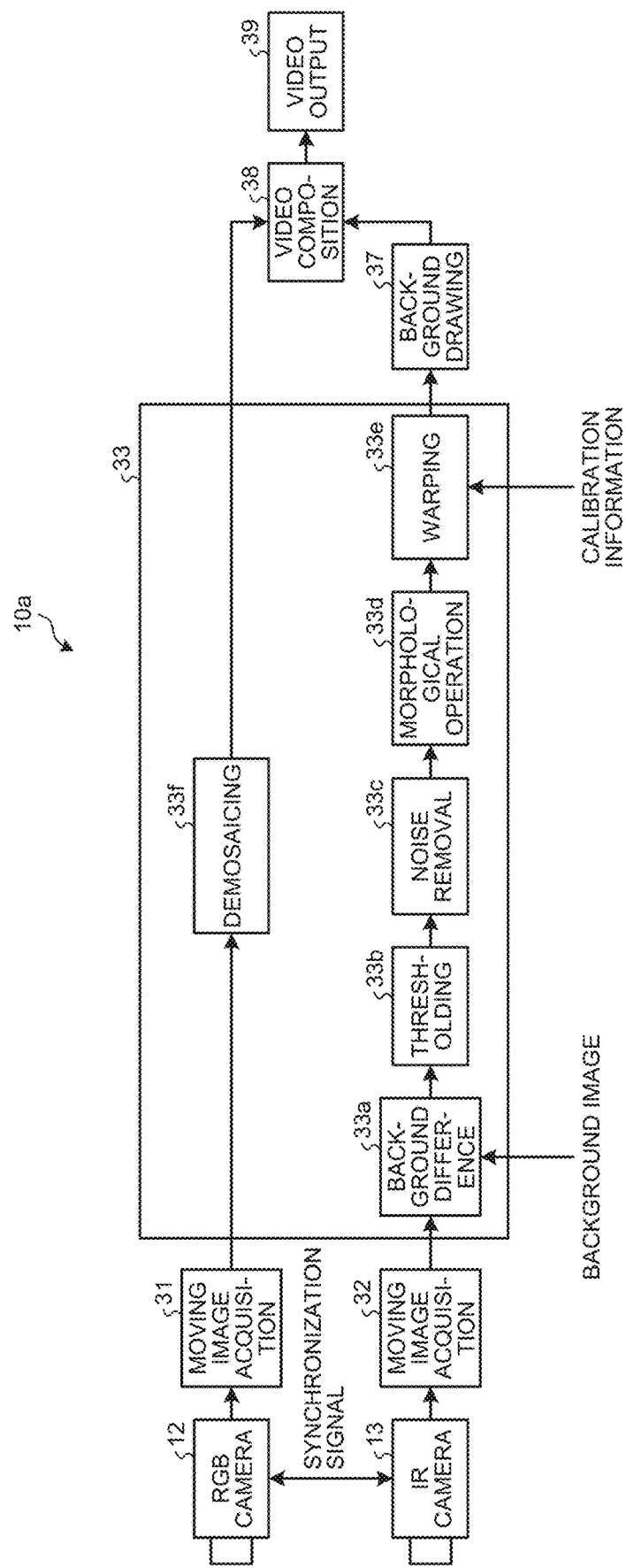
FIG. 5 is a diagram illustrating a procedure of a subject region extraction process performed by a subject region extraction unit.
Figure 6:
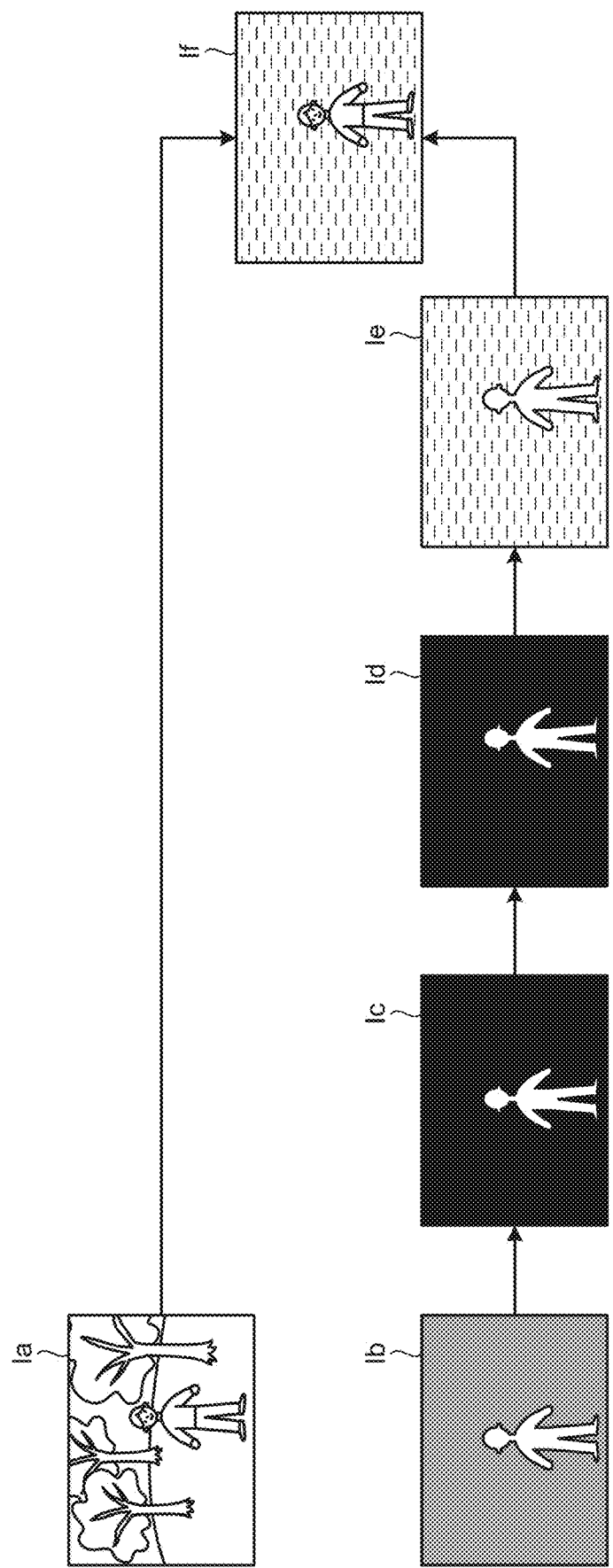
FIG. 6 is a view illustrating an example of images generated in a process of generating a composite video.

Next, the contents of a subject region extraction process performed by the subject region extraction unit 33 will be described with reference to FIGS. 4 to 6. FIG. 4 is an exemplary external view of an installation state of the RGB camera, the IR camera, and the IR light. FIG. 5 is a diagram illustrating a procedure of the subject region extraction process performed by the subject region extraction unit. FIG. 6 is a view illustrating an example of images generated in the process of generating the composite video.

The RGB camera 12 and the IR camera 13 are installed at positions close to each other, facing in substantially the same direction. In other words, the RGB camera 12 and the IR camera 13 capture substantially the same range. Then, the IR light 14 is installed in the vicinity of the IR camera 13. The IR light 14 includes, for example, a plurality of infrared LEDs to illuminate the shooting range of the IR camera 13. In the example of FIG. 4, the IR light 14 is incorporated in a camera mount 11 on which the RGB camera 12 and the IR camera 13 are installed. Note that a plurality of the cameras having the configuration of FIG. 4 may be installed so as to surround the subject 92, acquiring a so-called volumetric video. Note that, in a case where the cameras are installed to surround the subject 92, cameras positioned in a diagonal direction desirably capture images at different times. This is because simultaneously capturing images by the cameras positioned in a diagonal direction causes noise due to light from the IR lights 14 positioned in the diagonal direction.

As illustrated in FIG. 5, the RGB camera 12 and the IR camera 13 capture images in synchronization with each other. The RGB video (moving image) captured by the RGB camera 12 is acquired by the visible-light moving image acquisition unit 31 (image Ia in FIG. 6). Furthermore, the IR video (moving image) captured by the IR camera 13 is acquired by the infrared moving image acquisition unit 32 (image Ib in FIG. 6). Note that the process described below is performed for each image acquired, and therefore, the description will be made of not the moving image but the image.

The subject region extraction unit 33 extracts the region of the subject 92 from an RGB image acquired by the visible-light moving image acquisition unit 31, according to the procedure illustrated in FIG. 5. More specifically, the subject region extraction unit 33 extracts the region of the subject 92 from an IR image acquired by the infrared moving image acquisition unit 32, and extracts a region corresponding to the region of the subject 92 from the RGB image acquired by the visible-light moving image acquisition unit 31.

First, the subject region extraction unit 33 calculates a difference (background difference 33a) between the IR image acquired by the infrared moving image acquisition unit 32 and a background image without the subject 92, captured by the IR camera 13 with the IR light 14 on. The region of the subject 92 has an infrared reflectance that is higher than that of the background image, and therefore, looks brighter in the IR image acquired by the infrared moving image acquisition unit 32, upon observation. Therefore, the background difference 33a provides the IR image being an image with the region of the subject 92 brightly emphasized.

Next, the subject region extraction unit 33 performs thresholding 33b on the IR image after calculating the background difference 33a. The thresholding 33b is processing of extracting only pixels having pixel values indicating brightness higher than a preset threshold. The region (mask) corresponding to the region of the subject 92 is extracted by the thresholding 33b.

The region extracted in the thresholding 33b generally includes noise, and therefore, the subject region extraction unit 33 performs noise removal 33c. The noise removal 33c is performed, for example, by removing an isolated region having an area equal to or less than a predetermined threshold.

Furthermore, the subject region extraction unit 33 performs morphological operation 33d. The morphological operation 33d is processing that is performed on a binary image, for example, processing of filling a hole, for example, generated in the region. The morphological operation 33d provides an image Ic illustrated in FIG. 6.

Next, the subject region extraction unit 33 performs warping 33e. The warping 33e is processing of moving the position of feature points specified in the image, for transformation into another image (nomography transform). Specifically, calibration information that is acquired in advance is used to predict how the position and shape of the region of the subject 92 extracted from the IR image captured by the IR camera 13 appears in the RGB image captured by the RGB camera 12. The warping 33e provides an image Id illustrated in FIG. 6.

Meanwhile, the subject region extraction unit 33 performs demosaicing 33f on the RGB image captured by the RGB camera 12. The demosaicing 33f is, for example, processing of correcting brightness of the image.

The background drawing unit 37 then draws the background information 94 in the region other than the region (mask) of the subject 92 determined by the warping 33e (image Ie in FIG. 6).

Then, the video compositing unit 38 combines the background information 94 drawn by the background drawing unit 37 with the image captured by the RGB camera 12, subjected to the demosaicing by the subject region extraction unit 33. In this way, the composite video 95 (image If in FIG. 6) is generated in which the visible light image captured by the RGB camera 12, that is, the image of the subject 92 is combined at a position corresponding to the region of the subject 92, in the background information 94.

Then, the display control unit 39 causes the LED panel 15 to display the composite video 95.

[1-5. Description of Visual Effects]

Figure 7:
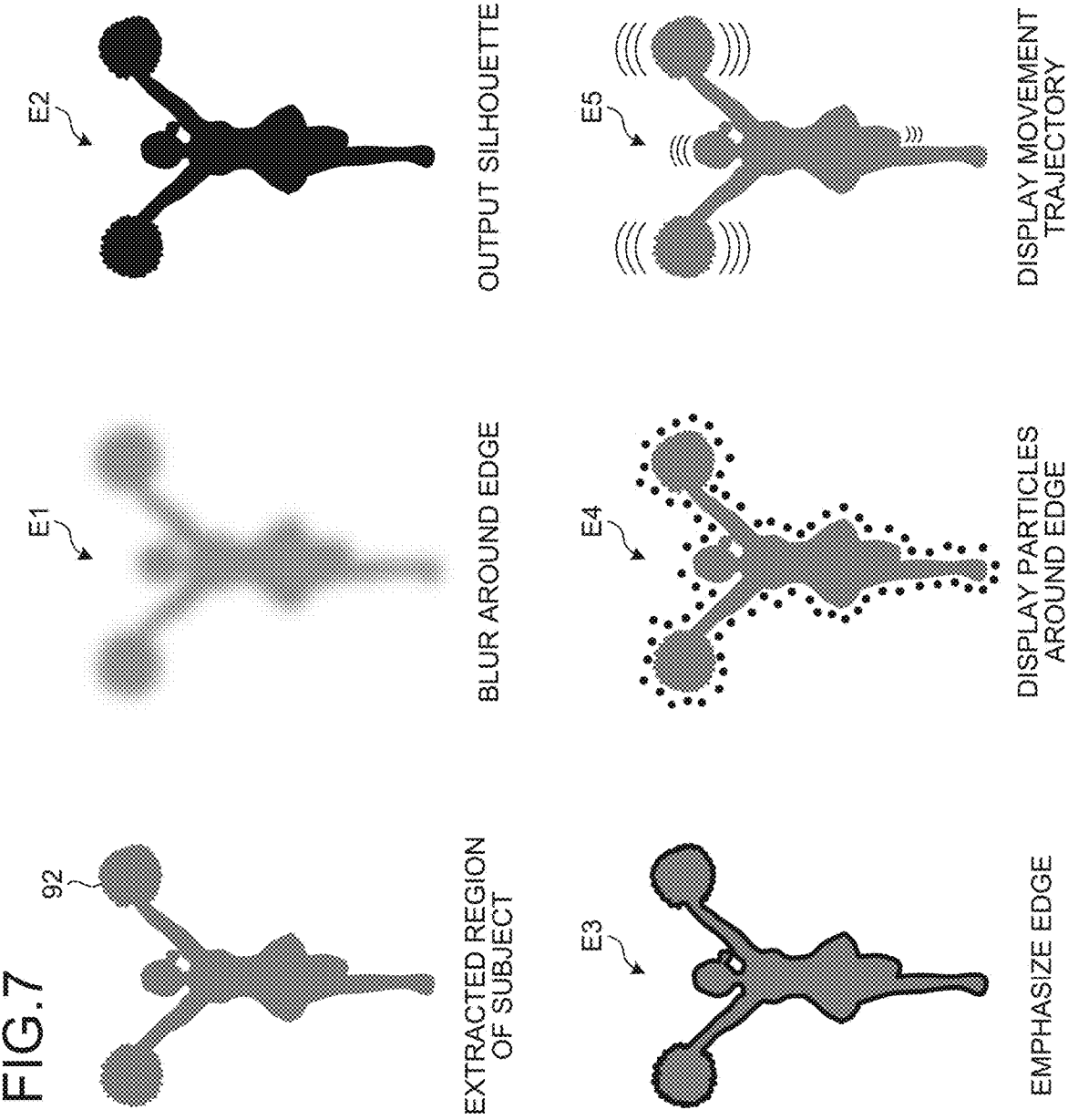
FIG. 7 is a diagram illustrating an example of effects applied by an effect application unit.

Next, the visual effect applied by the effect application unit 36 will be described with reference to FIG. 7. FIG. 7 is a diagram illustrating an example of the effects applied by the effect application unit.

The subject emphasizing device 20a applies various visual effects to the extracted region of the subject 92. Therefore, a video image of the subject 93 to which the visual effect is applied is generated. Although the type of the visual effect is not limited, an example thereof is illustrated in FIG. 7.

A visual effect E1 is used to blur the edge of the contour of the subject 92. The visual effect E1 provides an effect of making an error in extraction of the region of the subject 92 unnoticeable.

A visual effect E2 is used to output the silhouette of the subject 92. The visual effect E2 provides an effect of emphasizing the shape of the subject 92.

A visual effect E3 is used to change the color or brightness of the edge of the contour of the subject 92. The visual effect E3 provides an effect of emphasizing the subject 92.

A visual effect E4 is used to display moving particles around the contour of the subject 92. The visual effect E4 provides an effect of emphasizing the contour of the subject 92.

A visual effect E5 is used to express the movement trajectory of the subject 92 by propagating the contours of the subject 92 extracted in the previous frames. The visual effect E5 provides an effect of emphasizing the motion of the subject 92.

Note that the types of visual effects are not limited to those illustrated in FIG. 7. For example, an effect such as blurring the entire region of the subject 92 or changing the color of the region of the subject 92 may be applied.

[1-6. Calculation of Effect Intensity]

Figure 8:
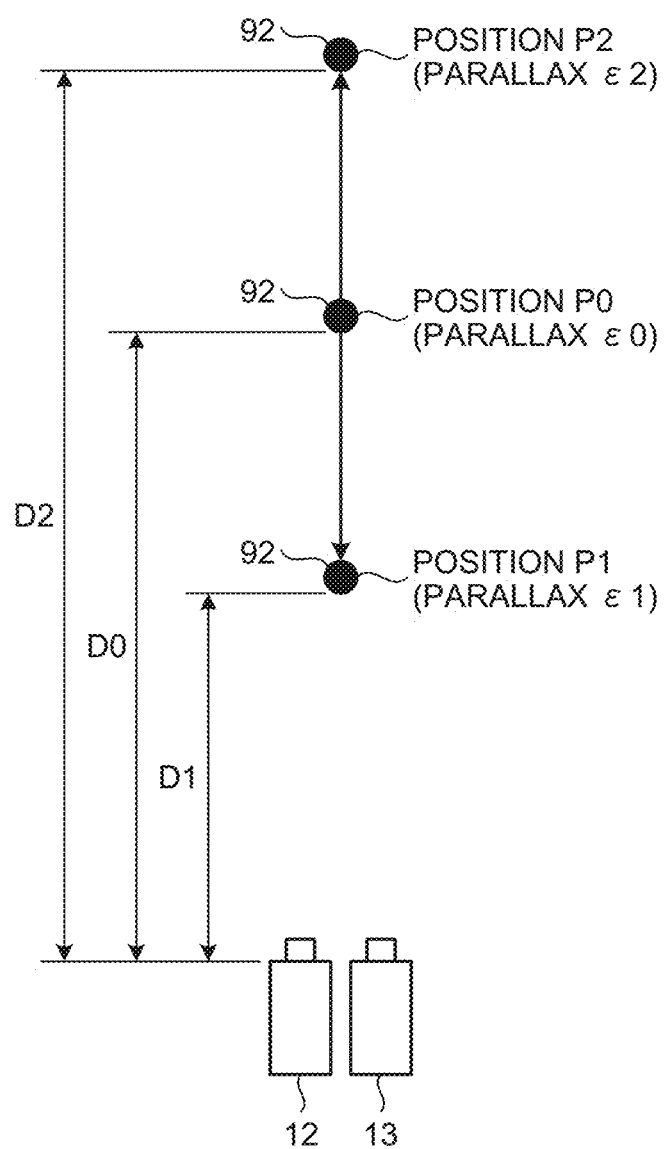
FIG. 8 is a diagram illustrating a change in magnitude of a difference between a position of a subject observed by the RGB camera and a position of the subject observed by the IR camera, according to shooting distance.

Next, calculation of the intensity of the visual effect performed by the effect intensity calculation unit 35 will be described with reference to FIG. 8. FIG. 8 is a diagram illustrating a change in magnitude of a difference between a position of the subject observed by the RGB camera and a position of the subject observed by the IR camera, according to the shooting distance.

The RGB camera 12 and the IR camera 13 are placed at positions separated from each other. Therefore parallax ε occurs in the position of the subject 92 as captured by the respective camera. Therefore, the subject emphasizing device 20a performs calibration in advance and acquires the positional relationship between the RGB camera 12 and the IR camera 13.

In general, calibration is performed by simultaneously acquiring images of the subject 92 by the RGB camera 12 and the IR camera 13 with the subject 92 arranged at a predetermined place on the stage 90, and analyzing a displacement (parallax ε) in the position of the subject 92 as acquired by the two cameras. In the calibration, the internal parameters and external parameters of the camera are estimated. More specifically, for the calibration, a calibration board having a grid pattern thereon and held by the subject 92 is used, and the calibration is performed by associating the positions of grids on a calibration board observed by the RGB camera 12 with the positions of grids on the calibration board observed by the IR camera 13.

In FIG. 8, it is assumed that the calibration is performed when the subject 92 is located at a position P0 (distance D between the camera and the subject 92=D0). In addition, It is assumed that the parallax ε is ε=ε0 at this time.

When the subject 92 moves from a position where the calibration has been performed, the parallax ε differs from that when the calibration has been performed, and the RGB image acquired from the RGB camera 12 cannot be accurately aligned with the IR image acquired from the IR camera 13.

For example, it is assumed that the subject 92 approaches the cameras from the position where the calibration has been performed and moves to a position P1 (distance D between the camera and the subject 92=D1). At this time, the parallax ε of the subject 92=ε1 between the images captured by the RGB camera 12 and the IR camera 13 is larger than the parallax ε=ε0 in the position P0 where the calibration has been performed. In other words, ε1>ε0 is satisfied. Therefore, even if information obtained by the calibration is used, the region of the subject 92 cannot be accurately extracted.

Meanwhile, it is assumed that the subject 92 moves in a direction away from the cameras from the position where the calibration has been performed and moves to a position P2 (distance D between the camera and the subject 92=D2). At this time, the parallax ε of the subject 92=ε2 between images captured by the RGB camera 12 and the IR camera 13 is smaller than the parallax ε=ε0 in the position P0 where the calibration has been performed. In other words, ε2<ε0 is satisfied. Therefore, even if the information obtained by the calibration is used, the region of the subject 92 cannot be accurately extracted.

The effect intensity calculation unit 35 sets the intensity of the visual effect according to the distance (shooting distance) between the camera and the subject 92. Specifically, when the shooting distance is shorter than a predetermined distance, that is, when the subject 92 is closer than the position where the calibration has been performed (when the subject 92 is located at a position in which the parallax ε is larger than that in the position where the calibration has been performed), the visual effect is applied that has intensity higher than the intensity of the visual effect applied when the subject 92 is located at the position where the calibration has been performed. This configuration makes positional displacement caused upon extraction of the region of the subject 92 unnoticeable. Note that the higher intensity of the visual effect means, for example, applying a stronger visual effect such as greatly blurring the edge around the subject 92.

On the other hand, when the shooting distance is longer than the predetermined distance, that is, when the subject 92 is located at a position farther than the position where the calibration has been performed (when the subject 92 is located at a position in which the parallax ε is smaller than that in the position where the calibration has been performed), the visual effect is preferably applied that has intensity equal to or less than the intensity of the visual effect applied when the subject 92 is located at the position where the calibration has been performed.

Here, the distance (shooting distance) between the camera and the subject 92 is calculated, for example, by the shooting distance calculation unit 34, on the basis of the size (height) of the region of the subject 92 extracted from the infrared image photographed by the IR camera 13. Note that a distance measuring unit such as a time of flight (TOF) sensor may be installed in the vicinity of the RGB camera 12 or the IR camera 13 so that the distance to the region of the subject 92 may be measured by the distance measuring unit.

[1-7. Procedure of Processing Performed by Subject Emphasizing Device]

Figure 9:
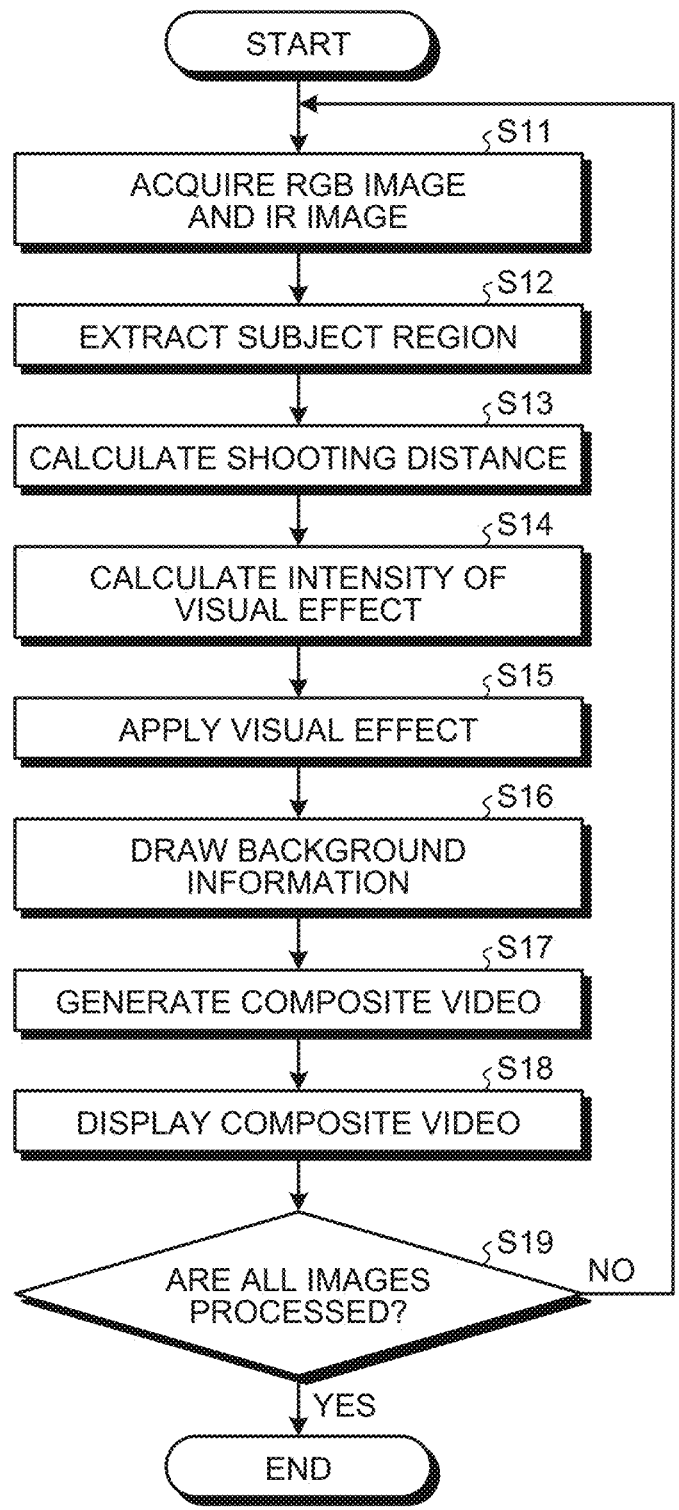
FIG. 9 is a flowchart illustrating an example of a procedure of processing performed by the subject emphasizing device according to the first embodiment.

A procedure of processing performed by the subject emphasizing device 20a will be described with reference to FIG. 9. FIG. 9 is a flowchart illustrating an example of the procedure of the processing performed by the subject emphasizing device according to the first embodiment. Note that the flowchart of FIG. 9 illustrates the procedure of the processing performed after the calibration for acquiring the positional relationship between the RGB camera 12 and the IR camera 13.

The visible-light moving image acquisition unit 31 and the infrared moving image acquisition unit 32 simultaneously acquire the RGB image and the IR image with the IR light 14 on (Step S11).

The subject region extraction unit 33 extracts the region of the subject 92 from the IR image acquired by the infrared moving image acquisition unit 32 (Step S12).

The shooting distance calculation unit 34 calculates the shooting distance from the IR camera 13 to the subject 92 (Step S13).

The effect intensity calculation unit 35 calculates the intensity of the visual effect on the basis of the shooting distance calculated in Step S13 (Step S14).

The effect application unit 36 applies the visual effect to the region of the subject 92 to generate a region of the subject 93 to which the visual effect has been applied (Step S15).

The background drawing unit 37 generates and draws the background information 94 (Step S16).

The video compositing unit 38 generates the composite video 95 in which the background information 94 is combined with the region of the subject 93 to which the visual effect has been applied (Step S17).

The display control unit 39 causes the LED panel 15 to display the composite video 95 (Step S18).

The visible-light moving image acquisition unit 31 determines whether all the images are processed (Step S19). When it is determined that all the images are processed (Step S19: Yes), the subject emphasizing device 20a finishes the process of FIG. 9. On the other hand, when it is not determined that all the images are processed (Step S19: No), the process returns to Step S11.

[1-8. Effects of First Embodiment]

As described above, in the subject emphasizing device 20a (information processing device) according to the first embodiment, the visible-light moving image acquisition unit 31 (first acquisition unit) acquires the RGB video (moving image) including the subject 92 and the background, and the subject region extraction unit 33 extracts the region of the subject 92 from the moving image acquired by the visible-light moving image acquisition unit 31. Then, the background drawing unit 37 draws the background information 94, in the region other than the region of the subject 92 in the moving image acquired by the visible-light moving image acquisition unit 31. The effect application unit 36 applies the visual effect to the region of the subject 92, on the basis of the intensity of the visual effect to be applied to the region of the subject 92, which is determined by the effect intensity calculation unit 35 according to the distance from the camera to the subject 92 (information about environment of acquiring the moving image). The video compositing unit 38 combines the region of the subject 92 to which the visual effect has been applied by the effect application unit 36 with the background information 94 drawn by the background drawing unit 37, generating the composite video 95.

This configuration makes it possible to extract the region of the subject 92 from any background and apply the visual effect in real time. Furthermore, a boundary between the subject 92 and the background information 94 can be naturally shown.

Furthermore, according to the subject emphasizing device 20*a* (information processing device) of the first embodiment, the effect application unit 36 applies the effect to the region of the subject 92, on the basis of the intensity of the effect determined by the effect intensity calculation unit 35, according to the shooting distance to the subject 92 calculated by the shooting distance calculation unit 34.

This configuration makes it possible to apply the visual effect for making the error unnoticeable when there is a possibility that the error may occur in extraction of the region of the subject 92.

Furthermore, according to the subject emphasizing device 20*a* (information processing device) of the first embodiment, in a case where the shooting distance calculated by the shooting distance calculation unit 34 is shorter than the shooting distance (predetermined distance) upon calibration, the effect application unit 36 increases the intensity of the visual effect and applies the visual effect to the region of the subject 92.

This configuration makes it possible to apply the visual effect further making the error more unnoticeable when the error may occur in extraction of the region of the subject 92.

Furthermore, according to the subject emphasizing device 20*a* (information processing device) of the first embodiment, the infrared moving image acquisition unit 32 (second acquisition unit) acquires an intensity distribution (IR image) of the reflected light of the infrared light (invisible light) emitted to the subject 92, captured at a predetermined relative position from the RGB camera 12, in synchronization with the visible-light moving image acquisition unit 31 (first acquisition unit). Then, the subject region extraction unit 33 transforms the region of the subject 92 extracted from the IR image acquired by the infrared moving image acquisition unit 32 into the shape and position expected to be acquired by the visible-light moving image acquisition unit 31, and applies the transformed region to the RGB image actually acquired by the visible-light moving image acquisition unit 31, thereby extracting the region of the subject 92.

This configuration makes it possible to accurately extract the region of the subject 92 with simple processing, even when the ambient light environment is drastically changed.

Furthermore, according to the subject emphasizing device 20*a* (information processing device) of the first embodiment, the invisible light is infrared light.

This configuration makes it possible to accurately extract the region of the subject 92 with simple processing without being affected by the surrounding light environment.

Furthermore, according to the subject emphasizing device 20*a* (information processing device) of the first embodiment, the display control unit 39 (video display unit) causes to display the composite video 95 from the video compositing unit 38.

This configuration makes it possible to combine the region of the subject 93 to which the visual effect has been applied with any background information 94.

Furthermore, according to the subject emphasizing device 20*a* (information processing device) of the first embodiment, the display control unit 39 (video display unit) displays the composite video 95 behind the subject 92.

This configuration makes it possible for the viewer to simultaneously view the subject 92 and the composite video 95.

Furthermore, according to the subject emphasizing device 20*a* (information processing device) of the first embodiment, the effect application unit 36 applies the visual effect to the outer periphery of the region of the subject 92.

This configuration makes it possible to effectively emphasize the subject 92.

[1-9. Modification of First Embodiment]

Next, a subject emphasizing system 10*b* (not illustrated) according to a modification of the first embodiment will be described. The subject emphasizing system 10*b* includes a subject emphasizing device 20*b*, instead of the subject emphasizing device 20*a* of the subject emphasizing system 10*a* described in the first embodiment.

Figure 10:
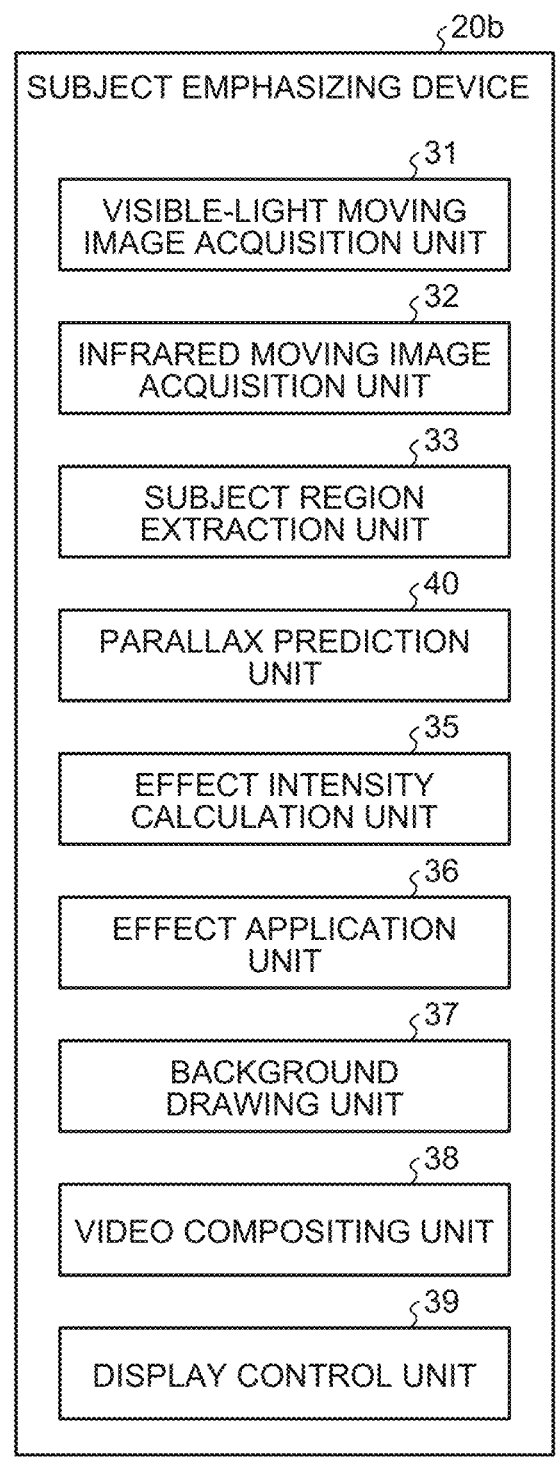
FIG. 10 is a functional block diagram illustrating an example of a functional configuration of a subject emphasizing device according to a modification of the first embodiment.

FIG. 10 is a functional block diagram illustrating an example of a functional configuration of the subject emphasizing device according to the modification of the first embodiment.

The subject emphasizing device 20*b* includes a parallax prediction unit 40 instead of the shooting distance calculation unit 34 of the subject emphasizing device 20*a*. The parallax prediction unit 40 predicts the maximum value of a displacement between the actual position of the subject 92 and a result of extraction of the subject 92, on the basis of a moving range of the subject 92.

In the first embodiment, the subject emphasizing device 20*a* has been extracted the region of the subject 92, on the basis of the positional relationship between the RGB camera 12 and the IR camera 13 acquired in advance by the calibration. The calibration is performed using a pair of the RGB image and the IR image simultaneously captured in a state where the subject 92 is stationary at a predetermined position on the stage 90. Therefore, as described in the first embodiment, when the subject 92 moves on the stage 90, the region of the subject 92 cannot be accurately extracted.

However, the moving range of the subject 92 is limited to a range of the stage 90, and if the size of the stage 90 are known in advance, a range of the parallax ε between the subject 92 observed by the RGB camera 12 and the subject 92 observed by the IR camera 13 can be estimated.

In the subject emphasizing device 20*b* according to the modification of the first embodiment, the effect intensity calculation unit 35 calculates the intensity of the visual effect, on the basis of the maximum value of the parallax ε of the subject 92 predicted by the parallax prediction unit 40.

More specifically, regardless of the position of the subject 92, the effect intensity calculation unit 35 applies the visual effect having an intensity according to the maximum value of the parallax ε expected to occur when the subject 92 moves around on the stage 90.

In other words, when the subject 92 is located at a position where the parallax ε is the largest, the visual effect of making the positional displacement of the region of the subject 92 extracted by the subject emphasizing device 20b unnoticeable is applied. Therefore, the positional displacement of the region of the subject 92 can be made unnoticeable regardless of where the subject 92 is on the stage 90.

Although the description of a procedure of processing performed by the subject emphasizing device 20b is omitted, in the flowchart of FIG. 9, instead of Step S13, the parallax prediction unit 40 performs processing of calculating the maximum value of the parallax c on the basis of the information acquired by the calibration and the size of the stage 90. Then, in Step S14, the effect intensity calculation unit 35 calculates the intensity of the visual effect on the basis of the maximum value of the parallax ε. Otherwise, the steps of the processing are the same as those illustrated in FIG. 9. In addition, these steps do not need to be performed for each image, and are preferably performed only once at the beginning.

[1-10. Effects of Modification of First Embodiment]

As described above, according to the subject emphasizing device 20b (information processing device) of the modification of the first embodiment, the effect application unit 36 applies the visual effect according to the maximum value of the parallax ε (displacement) between the actual position of the subject 92 and the result of the extraction of the subject 92, predicted by the parallax prediction unit 40, on the basis of the moving range of the subject 92, to the region of the subject 92.

This configuration makes it possible to make the positional displacement of the region of the subject 92 unnoticeable, even when the subject 92 moves on the stage 90. Furthermore, the intensity of the visual effect only needs to be calculated once upon processing the first image, providing high-speed processing.

2. Second Embodiment

The subject emphasizing system 10a described in the first embodiment includes the two cameras (the RGB camera 12 and the IR camera 13), causing the positional displacement in installation between the cameras, requiring the calibration. A subject emphasizing system 10c (not illustrated) according to a second embodiment includes an RGB-IR camera 16 (see FIG. 11) in which the RGB camera 12 and the IR camera 13 are integrated into one camera.

In another example of the environment of acquiring the moving image, the subject emphasizing system 10c (not illustrated) according to the second embodiment sets the intensity of the visual effect, on the basis of a difference between a processing time for the IR image and a processing time for the RGB image, that is, a delay in a processing time.

[2-1. Functional Configuration of Subject Emphasizing Device]

The subject emphasizing system 10c according to the second embodiment includes the RGB-IR camera 16, the IR light 14, a subject emphasizing device 20c, and the LED panel 15. In other words, in FIG. 1, the RGB camera 12 and the IR camera 13 are integrated into the RGB-IR camera 16, and the subject emphasizing device 20a is replaced with the subject emphasizing device 20c.

First, a structure of the RGB-IR camera 16 will be described with reference to FIG. 11. FIG. 11 is a diagram illustrating a schematic structure of the RGB-IR camera.

FIG. 11 illustrates two types of structures of the RGB-IR camera 16. An RGB-IR camera 16a is a camera that includes an imaging element 17 configured to simultaneously detect visible light and infrared light. The imaging element 17 has a structure in which an element having sensitivity to the infrared light is incorporated in part of the imaging element having a Bayer array. In other words, the imaging element 17 includes a pixel IR having sensitivity to infrared light, together with a pixel R, a pixel G, and a pixel B for generating the RGB image. Therefore, the RGB-IR camera 16a is configured to acquire the RGB image and the IR image by one camera. There is no parallax between the acquired RGB image and IR image, and therefore, it is possible to align the RGB image and the IR image without using the relative positional relationship between the cameras described in the first embodiment.

In an RGB-IR camera 16b, an optical path for incident light is divided into two by a beam splitter 18, and a visible light imaging element 19a and an infrared imaging element 19b are arranged ahead of the divided optical paths. The beam splitter 18 has a structure in which two right angle prisms are bonded to each other.

Figure 12:
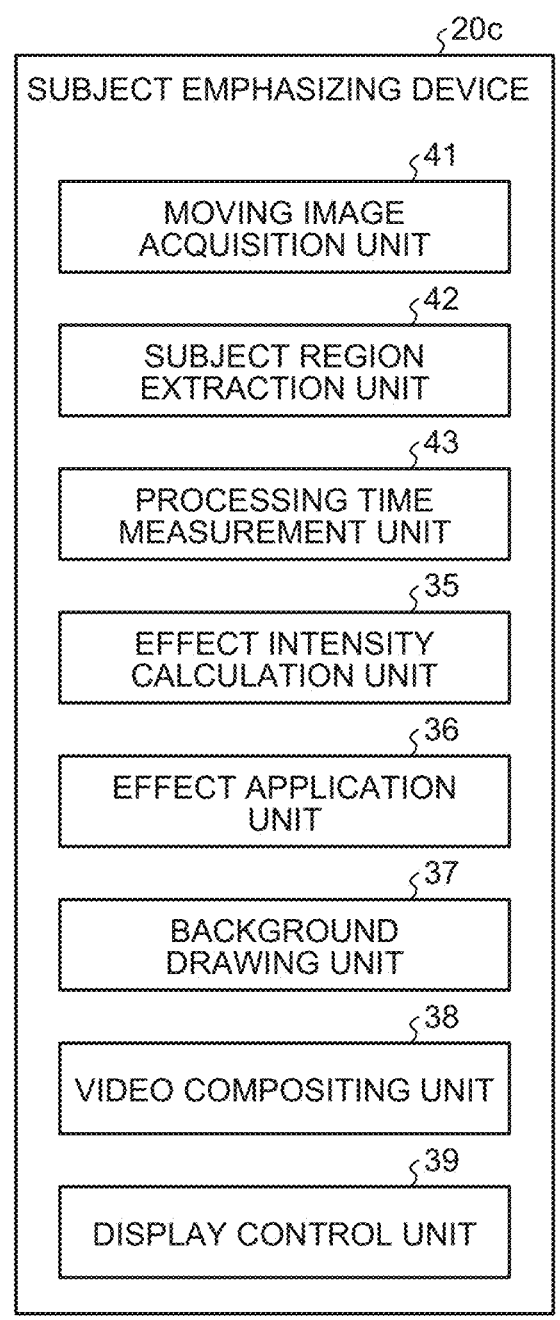
FIG. 12 is a functional block diagram illustrating an example of a functional configuration of a subject emphasizing device according to a second embodiment.

Next, a functional configuration of the subject emphasizing device 20c will be described with reference to FIG. 12. FIG. 12 is a functional block diagram illustrating an example of the functional configuration of the subject emphasizing device according to the second embodiment. In other words, the subject emphasizing device 20c includes a moving image acquisition unit 41 instead of the visible-light moving image acquisition unit 31 and the infrared moving image acquisition unit 32 of the subject emphasizing device 20a. In addition, a subject region extraction unit 42 is provided instead of the subject region extraction unit 33. Furthermore, a processing time measurement unit 43 is provided instead of the shooting distance calculation unit 34.

The moving image acquisition unit 41 acquires a video signal captured by the RGB-IR camera 16 to acquire the RGB video (moving image) including the subject 92 and the background. Furthermore, the moving image acquisition unit 41 acquires the video signal captured by the RGB-IR camera 16 with the timing of turning on the IR light 14, thereby acquiring the IR video (moving image) including the subject 92 and the background. Note that the moving image acquisition unit 41 is an example of the first acquisition unit and the second acquisition unit in the present disclosure.

The subject region extraction unit 42 extracts the region of the subject 92 from the RGB video acquired by the moving image acquisition unit 41.

The processing time measurement unit 43 measures an elapsed time after acquisition of the moving image by the moving image acquisition unit 41 (first acquisition unit).

[2-2. Description of Subject Region Extraction Process]

Figure 13:
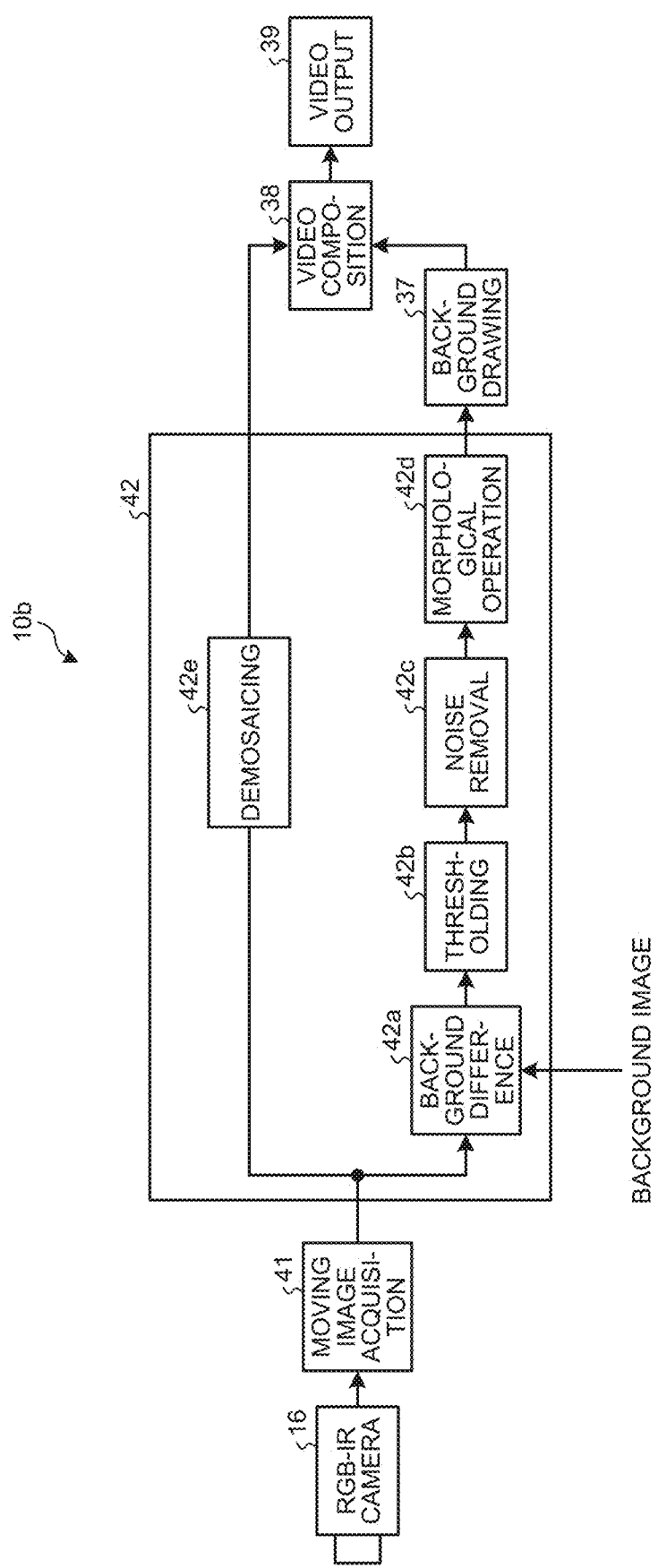
FIG. 13 is a diagram illustrating a procedure of a subject region extraction process performed by a subject region extraction unit according to the second embodiment.

Next, a subject region extraction process performed by the subject region extraction unit 42 will be described with reference to FIG. 13. FIG. 13 is a diagram illustrating a procedure of a subject region extraction process performed by the subject region extraction unit according to the second embodiment.

The RGB image and the IR image captured by the RGB-IR camera 16 are acquired by the moving image acquisition unit 41.

The subject region extraction unit 42 extracts the region of the subject 92 from the RGB image acquired by the moving image acquisition unit 41, according to the procedure illustrated in FIG. 13. More specifically, the subject region extraction unit 42 extracts the region of the subject 92 from the IR image acquired by the moving image acquisition unit 41, and extracts the region corresponding to the region of the subject 92 from the RGB image acquired by the moving image acquisition unit 41.

First, the subject region extraction unit 42 calculates a difference (background difference 42*a*) between the IR image acquired by the moving image acquisition unit 41 and a background image without the subject 92, captured by the RGB-IR camera 16 with the IR light 14 on. The region of the subject 92 has an infrared reflectance that is higher than that of the background image, and therefore, looks brighter in the IR image acquired by the moving image acquisition unit 41, upon observation. Therefore, the background difference 42*a* provides the IR image being an image with the region of the subject 92 brightly emphasized.

Next, the subject region extraction unit 42 performs thresholding 42*b* on the IR image after calculating the background difference 42*a*. The thresholding 42*b* is processing of extracting only pixels having pixel values indicating brightness higher than a preset threshold. The region (mask) corresponding to the region of the subject 92 is extracted by the thresholding 42*b*.

The region extracted by the thresholding 42*b* generally includes noise, and therefore, the subject region extraction unit 42 performs noise removal 42*c*. The noise removal 42*c* is performed, for example, by removing the isolated region having an area equal to or less than a predetermined threshold.

Furthermore, the subject region extraction unit 42 performs morphological operation 42*d*. The morphological operation 42*d* is processing that is performed on the binary image, for example, processing of filling a hole, for example, generated in the region. Although the warping 33*e* has been performed after that in the first embodiment, there is no parallax between the RGB image and the IR image in the present embodiment, and therefore, no warping is necessary.

Meanwhile, the subject region extraction unit 42 performs demosaicing 42*e* on the RGB image captured by the RGB-IR camera 16. The demosaicing 42*e* is, for example, processing of correcting brightness of the image.

Next, the background drawing unit 37 draws the background information 94 in the region other than the region (mask) of the subject 92 determined by the morphological operation 42*d*.

Then, the video compositing unit 38 combines the background information 94 drawn by the background drawing unit 37 with the RGB image subjected to the demosaicing by the subject region extraction unit 42. In this way, the composite video 95 is generated in which the visible light image captured by the RGB-IR camera 16, that is, the image of the subject 92 is combined at the position corresponding to the region of the subject 92, in the background information 94.

[2-3. Calculation of Effect Intensity]

Next, calculation of the intensity of the visual effect performed by the subject emphasizing device 20*c* will be described. Processing performed on the IR image to extract the region of the subject 92 by the subject region extraction unit 42 is larger than processing performed on the RGB image in the amount of processing. Therefore, the processing on the RGB image ends earlier than the processing on the IR image. When the delay in a time required for the processing on the IR image with respect to the time required for the processing on the RGB image is within a predetermined time set in advance, the processing can be continued in real time (e.g., video rate). However, when the time required for processing on the IR image is increased, real-time processing cannot be continued, and a difference occurs between the region of the subject 92 extracted from the IR image and the actual region of the subject 92 in the RGB image.

When the delay in the time required for processing the IR image with respect to the time required for processing the RGB image exceeds the predetermined time, the subject emphasizing device 20*c* of the present embodiment sets the intensity of the visual effect stronger, thereby making the positional displacement of the region of the subject 92 unnoticeable. More specifically, when the elapsed time measured by the processing time measurement unit 43 exceeds the predetermined time, the effect intensity calculation unit 35 calculates the intensity of the visual effect, depending on whether the subject region extraction unit 42 has completed extraction of the region of the subject 92.

In other words, the processing time measurement unit 43 measures the elapsed time after the moving image acquisition unit 41 acquires the RGB image and the IR image, and when the elapsed time exceeds the predetermined time, the visual effect having a higher intensity is applied. Note that the predetermined time is set to a time during which the subject region extraction unit 42 can perform processing of extracting the region of the subject 92 in real time (video rate).

[2-4. Procedure of Processing Performed by Subject Emphasizing Device]

Figure 14:
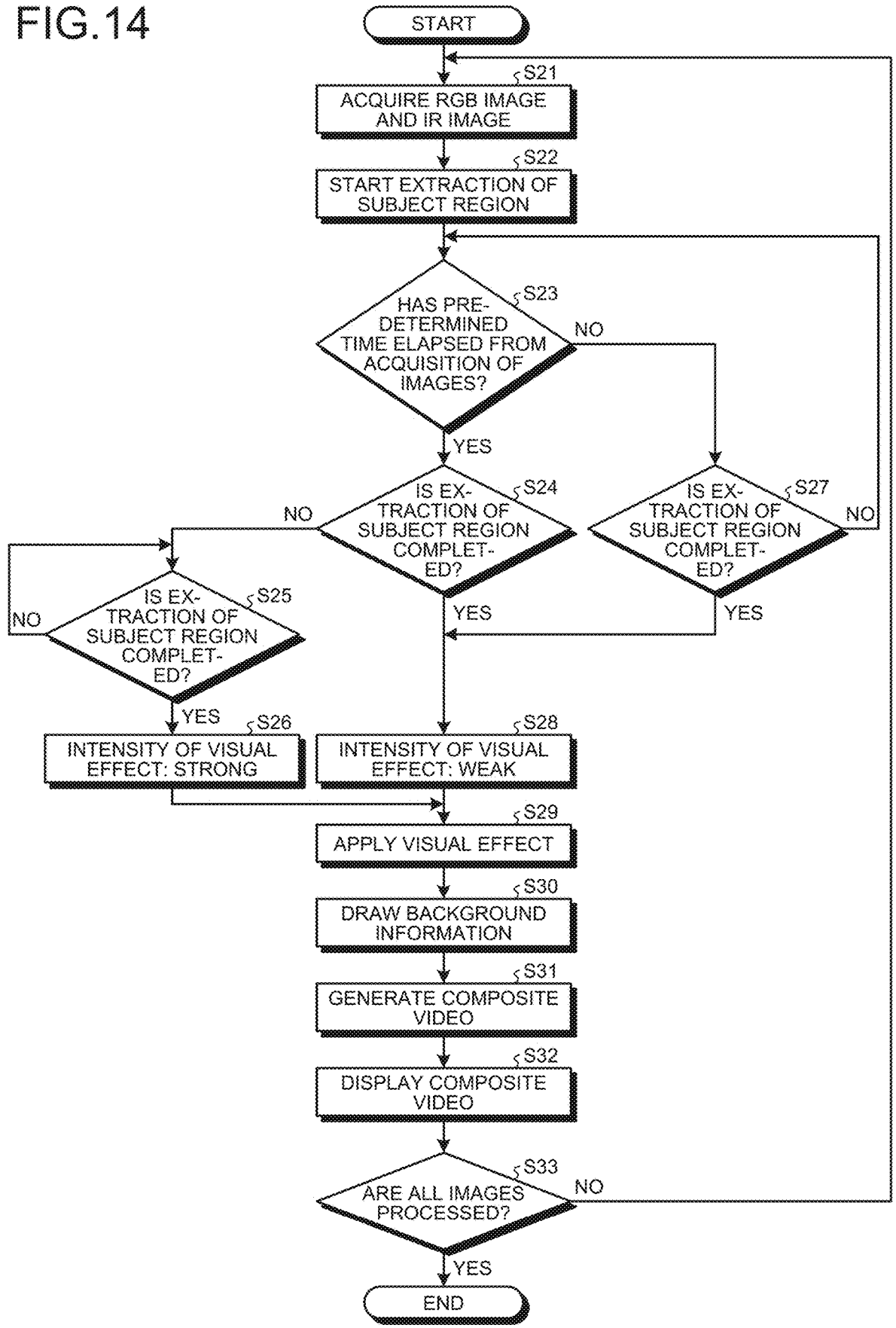
FIG. 14 is a flowchart illustrating an example of a procedure of processing performed by the subject emphasizing device according to the second embodiment.

A procedure of processing performed by the subject emphasizing device 20*c* will be described with reference to FIG. 14. FIG. 14 is a flowchart illustrating an example of the procedure of the processing performed by the subject emphasizing device according to the second embodiment.

The moving image acquisition unit 41 acquires the RGB image and the IR image (Step S21).

The subject region extraction unit 42 starts extraction of the region of the subject 92 (Step S22).

The processing time measurement unit 43 determines whether the predetermined time has elapsed from acquisition of the images (Step S23). When it is determined that the predetermined time has elapsed from the acquisition of the images (Step S23: Yes), the process proceeds to Step S24. On the other hand, when it is not determined that the predetermined time has elapsed from the acquisition of the images (Step S23: No), the process proceeds to Step S27.

If Yes in Step S23, the subject region extraction unit 42 determines whether the extraction of the region of the subject 92 is completed (Step S24). When it is determined that the extraction of the region of the subject 92 is completed (Step S24: Yes), the process proceeds to Step S28. On the other hand, when it is not determined that the extraction of the region of the subject 92 is completed (Step S24: No), the process proceeds to Step S25.

On the other hand, if No in Step S23, the subject region extraction unit 42 determines whether the extraction of the region of the subject 92 is completed (Step S27). When it is determined that the extraction of the region of the subject 92 is completed (Step S27: Yes), the process proceeds to Step S28. On the other hand, when it is not determined that the extraction of the region of the subject 92 is completed (Step S27: No), the process returns to Step S23.

Returning to Step S24, if No in Step S24, the subject region extraction unit 42 determines whether the extraction of the region of the subject 92 is completed (Step S25). When it is determined that the extraction of the region of the subject 92 is completed (Step S25: Yes), the process proceeds to Step S26. On the other hand, when it is not determined that the extraction of the region of the subject 92 is completed (Step S25: No), Step S25 is repeated.

If Yes in Step S24 or Step S27, the effect intensity calculation unit 35 sets the visual effect to a lower intensity (Step S28). Then, the process proceeds to Step S29.

If Yes in Step S25, the effect intensity calculation unit 35 sets the visual effect to a higher intensity (Step S26). Then, the process proceeds to Step S29.

Subsequent to Step S26 or Step S28, the effect application unit 36 applies a preset visual effect to the region of the subject 92 (Step S29).

Next, the background drawing unit 37 generates and draws the background information 94 (Step S30).

The video compositing unit 38 generates the composite video 95 in which the background information 94 is combined with the region of the subject 93 to which the visual effect has been applied (Step S31).

The display control unit 39 causes the LED panel 15 to display the composite video 95 (Step S32).

The moving image acquisition unit 41 determines whether all the images are processed (Step S33). When it is determined that all the images are processed (Step S33: Yes), the subject emphasizing device 20c finishes the process of FIG. 14. On the other hand, when it is not determined that all the images are processed (Step S33: No), the process returns to Step S21.

[2-5. Effects of Second Embodiment]

As described above, according to the subject emphasizing device 20c (information processing device) of the second embodiment, when the elapsed time from the acquisition of the moving images by the moving image acquisition unit 41 (first acquisition unit), measured by the processing time measurement unit 43 exceeds the predetermined time, the effect application unit 36 applies the visual effect to the region of the subject 92, on the basis of the intensity of the visual effect determined depending on whether the subject region extraction unit 42 has completed the extraction of the region of the subject 92.

This configuration makes it possible to make the positional displacement of the region of the subject 92 in the composite video 95 unnoticeable, even when a time is required for extracting the region of the subject 92.

Furthermore, according to the subject emphasizing device 20c (information processing device) of the second embodiment, if the subject region extraction unit 42 has not completed extraction of the region of the subject 92 when the elapsed time measured by the processing time measurement unit 43 exceeds the predetermined time, the effect application unit 36 increases the intensity of the visual effect and applies the visual effect to the region of the subject 92.

This configuration makes it possible to apply the visual effect increased and make the positional displacement of the region of the subject 92 in the composite video 95 unnoticeable, when a time is required for extracting the region of the subject 92.

[2-6. Modifications of Second Embodiment]

Next, a subject emphasizing system 10d (not illustrated) according a modification of the second embodiment will be described. The subject emphasizing system 10d includes a subject emphasizing device 20d instead of the subject emphasizing device 20c described in the second embodiment.

In the subject emphasizing system 10d, sudden change of the light environment caused by spotlight on the stage 90, firework on the stage 90, or the like triggers control of on/off of the visual effect.

Conventional on/off of the visual effect is controlled on the basis of a predetermined time table, requiring troublesome previous setting. Meanwhile, the subject emphasizing system 10d is configured to turn on/off the visual effect without setting on/off time for the visual effect in advance.

Specifically, when the number of pixels having brightness exceeding predetermined brightness exceeds a predetermined value in the IR image acquired by the moving image acquisition unit 41, the subject emphasizing device 20d determines that a sudden change in the light environment has occurred (a large amount of infrared light has been emitted), and turns on or off the visual effect.

Figure 15:
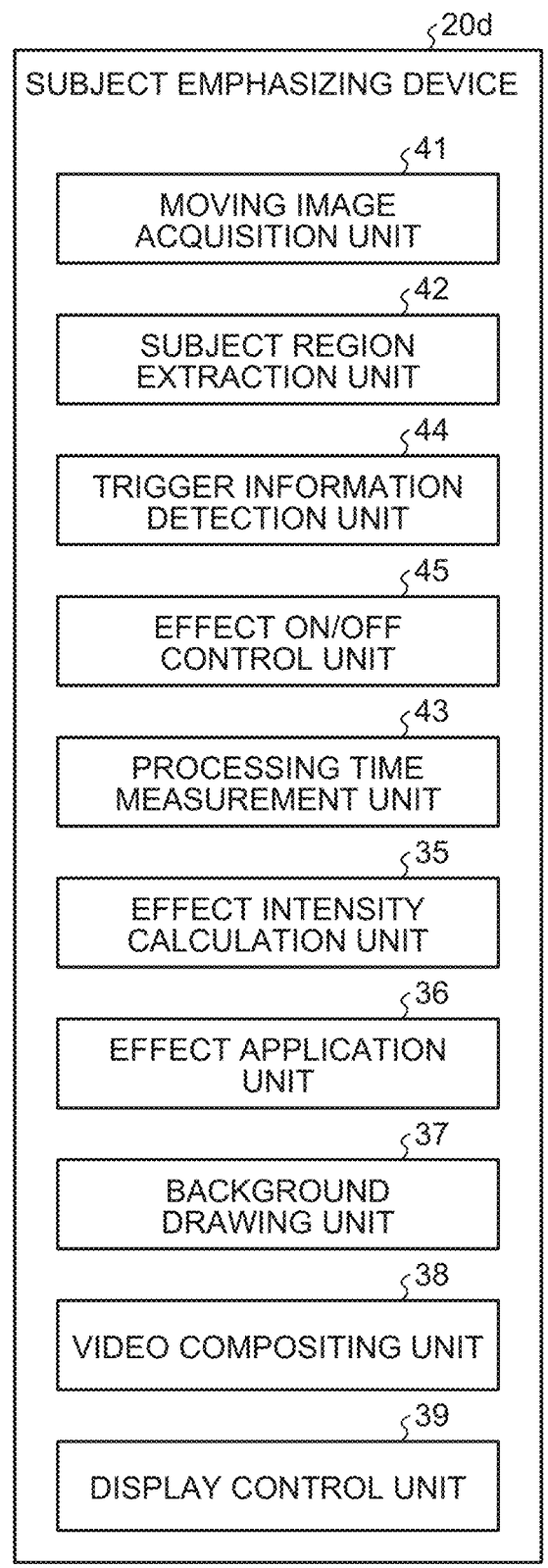
FIG. 15 is a functional block diagram illustrating an example of a functional configuration of a subject emphasizing device according to a modification of the second embodiment.

Next, a functional configuration of the subject emphasizing device 20d will be described with reference to FIG. 15. FIG. 15 is a functional block diagram illustrating an example of a functional configuration of the subject emphasizing device according to the modification of the second embodiment.

The subject emphasizing device 20d includes a trigger information detection unit 44 and an effect on/off control unit 45 in addition to the functional components of the subject emphasizing device 20c. The trigger information detection unit 44 counts the number of pixels having brightness equal to or more than a predetermined value in the IR image acquired by the moving image acquisition unit 41 (second acquisition unit).

The effect on/off control unit 45 switches whether to apply the visual effect or not, that is, whether to directly output the RGB image acquired by the moving image acquisition unit 41 or to output the composite video 95 from the video compositing unit 38, according to the number of pixels counted by the trigger information detection unit 44. Note that the effect on/off control unit 45 is an example of a switching unit in the present disclosure.

Figure 16:
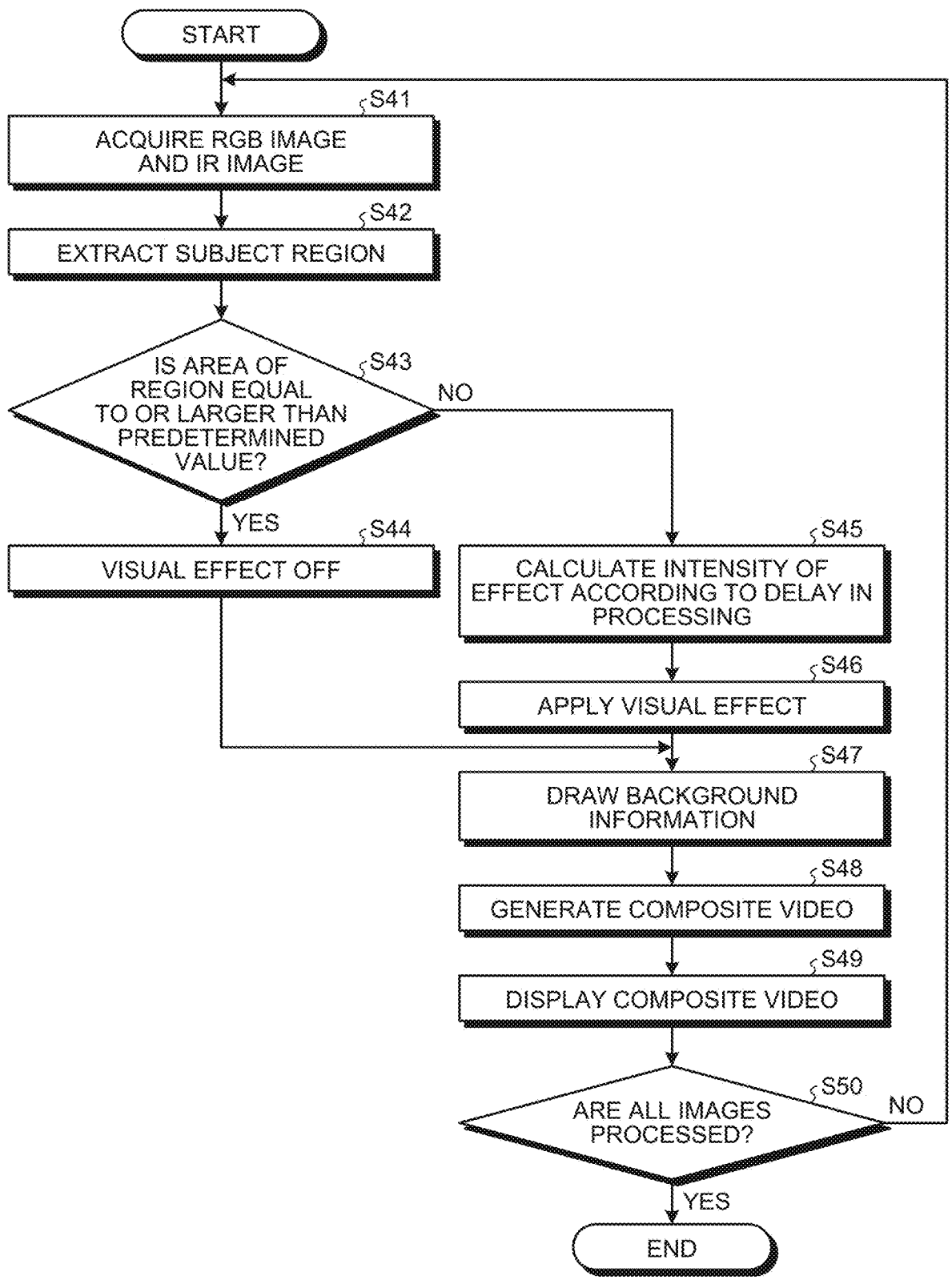
FIG. 16 is a flowchart illustrating an example of a procedure of processing performed by the subject emphasizing device according to the modification of the second embodiment.

Next, a procedure of processing performed by the subject emphasizing device 20d will be described with reference to FIG. 16. FIG. 16 is a flowchart illustrating an example of the procedure of the processing performed by the subject emphasizing device according to the modification of the second embodiment.

The moving image acquisition unit 41 acquires the RGB image and the IR image (Step S41).

The subject region extraction unit 42 extracts the region of the subject 92 (Step S42).

The trigger information detection unit 44 determines whether the number of pixels having brightness equal to or more than the predetermined brightness in the acquired IR image is equal to or larger than the predetermined value (Step S43). When it is determined that the number of pixels having brightness equal to or more than the predetermined brightness in the IR image is equal to or more than the predetermined value (Step S43: Yes), the process proceeds to Step S44. On the other hand, when it is not determined that the number of pixels having brightness equal to or more than the predetermined brightness in the IR image is equal to or more than the predetermined value (Step S43: No), the process proceeds to Step S45.

If Yes in Step S43, the effect on/off control unit 45 stops application of the visual effect (Step S44). Then, the process proceeds to Step S47.

On the other hand, if No in Step S43, the effect intensity calculation unit 35 sets the intensity of the visual effect according to the delay in the extraction of the region of the subject 92 (Step S45).

Then, the effect application unit 36 applies the visual effect (Step S46).

Next, the background drawing unit 37 generates and draws the background information 94 (Step S47).

The video compositing unit 38 generates the composite video 95 in which the background information 94 is combined with the region of the subject 93 to which the visual effect has been applied (Step S48).

The display control unit 39 causes the LED panel 15 to display the composite video 95 (Step S49).

The moving image acquisition unit 41 determines whether all the images are processed (Step S50). When it is determined that all the images are processed (Step S50: Yes), the subject emphasizing device 20d finishes the process of FIG. 16. On the other hand, when it is not determined that all the images are processed (Step S50: No), the process returns to Step S41.

Note that, in the flowchart, an example has been described in which the spotlight or the firework triggers the turning off of the visual effect, but conversely, the spotlight or the firework may trigger turning on of the visual effect. In addition, it is also possible to put the spotlight by using a projector configured to project pattern light to switch on/off of the visual effect only in an area to which the pattern light is emitted.

Note that it is also possible to determine the timing of spotlight according to an excitement state of the live venue. In other words, for example, sound pressure may be measured by a noise meter installed in the live venue to put the spotlight on the basis of the sound pressure reaching predetermined sound pressure. This configuration makes it possible to control the on/off of the visual effect by linking to the excitement of the live venue, thus, further enhancing the stage effect.

Furthermore, a predetermined motion of the subject 92 may trigger the spotlight. The predetermined motion of the subject 92 can be detected by, for example, a method (third embodiment) which is described later.

[2-7. Effects of Modifications of Second Embodiment]

As described above, according to the subject emphasizing device 20d (information processing device) of the modifications of the second embodiment, the effect on/off control unit 45 (switching unit) switches whether to apply the visual effect or not, according to the number of pixels having brightness equal to or more than the predetermined value in the IR image acquired by the moving image acquisition unit 41 (second acquisition unit), counted by the trigger information detection unit 44.

This configuration makes it possible to simply and reliably perform on/off control of the visual effect without setting a time for performing the on/off control of the effect in advance.

3. Third Embodiment

A subject emphasizing system 10e (not illustrated) according to the third embodiment detects motion of the subject 92 extracted and sets a region to which the background information 94 is combined, according to the detected motion.

The subject emphasizing system 10e includes a subject emphasizing device 20e, instead of the subject emphasizing device 20a of the subject emphasizing system 10a described in the first embodiment.

[3-1. Functional Configuration of Subject Emphasizing Device]

Figure 17:
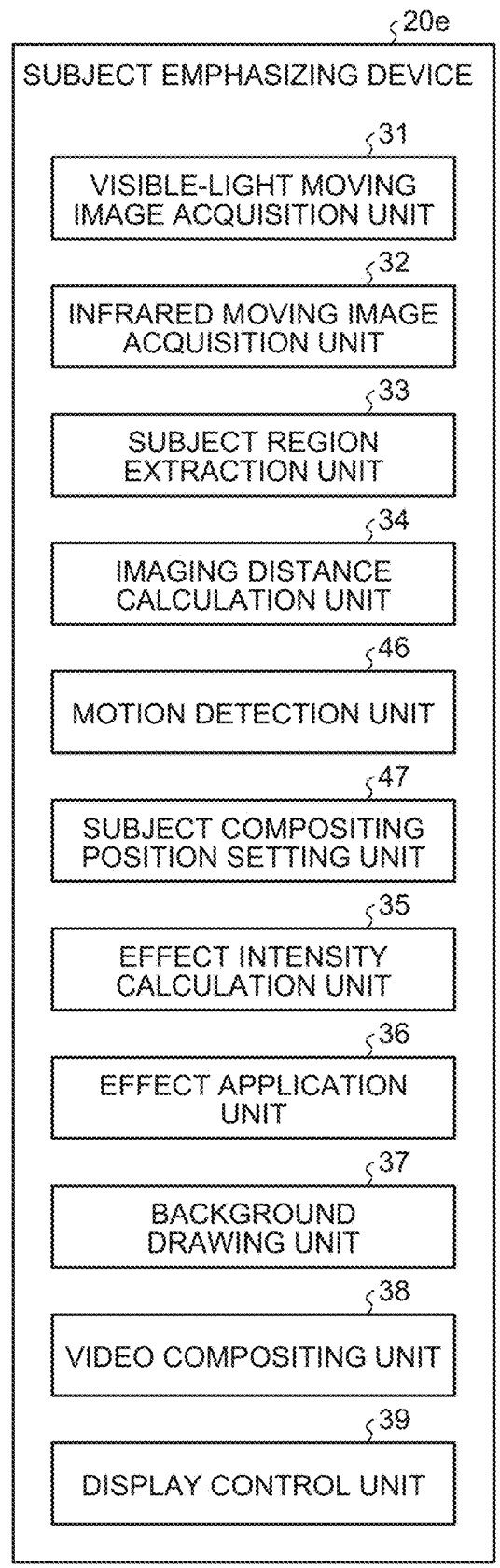
FIG. 17 is a functional block diagram illustrating an example of a functional configuration of a subject emphasizing device according to a third embodiment.

First, a functional configuration of the subject emphasizing device 20e will be described with reference to FIG. 17. FIG. 17 is a functional block diagram illustrating an example of the functional configuration of the subject emphasizing device according to the third embodiment.

The subject emphasizing device 20e has a functional configuration in which a motion detection unit 46 and a subject compositing position setting unit 47 are added to the subject emphasizing device 20a (see FIG. 3) described in the first embodiment.

The motion detection unit 46 detects the motion of the subject 92. Specifically, the motion detection unit 46 detects the magnitude of the motion and direction of the motion by detecting, for example, optical flow (motion vector), for the region of the subject 92 that is extracted at different times by the subject region extraction unit 33.

The subject compositing position setting unit 47 sets, on the basis of the motion of the subject 92 detected by the motion detection unit 46, a position at which the region of the subject 93 to which the visual effect is applied by the effect application unit 36 is combined with the background information 94 drawn by the background drawing unit 37. Specifically, the subject compositing position setting unit 47 sets the position of the subject 92 (to be precise, the position of the subject 93 on which the visual effect is applied) to be combined with the background information 94, on the basis of the magnitude of the motion and the direction of the motion of the subject 92. Note that the subject compositing position setting unit 47 is an example of a compositing position setting unit in the present disclosure.

[3-2. Procedure of Processing Performed by Subject Emphasizing Device]

Figure 18:
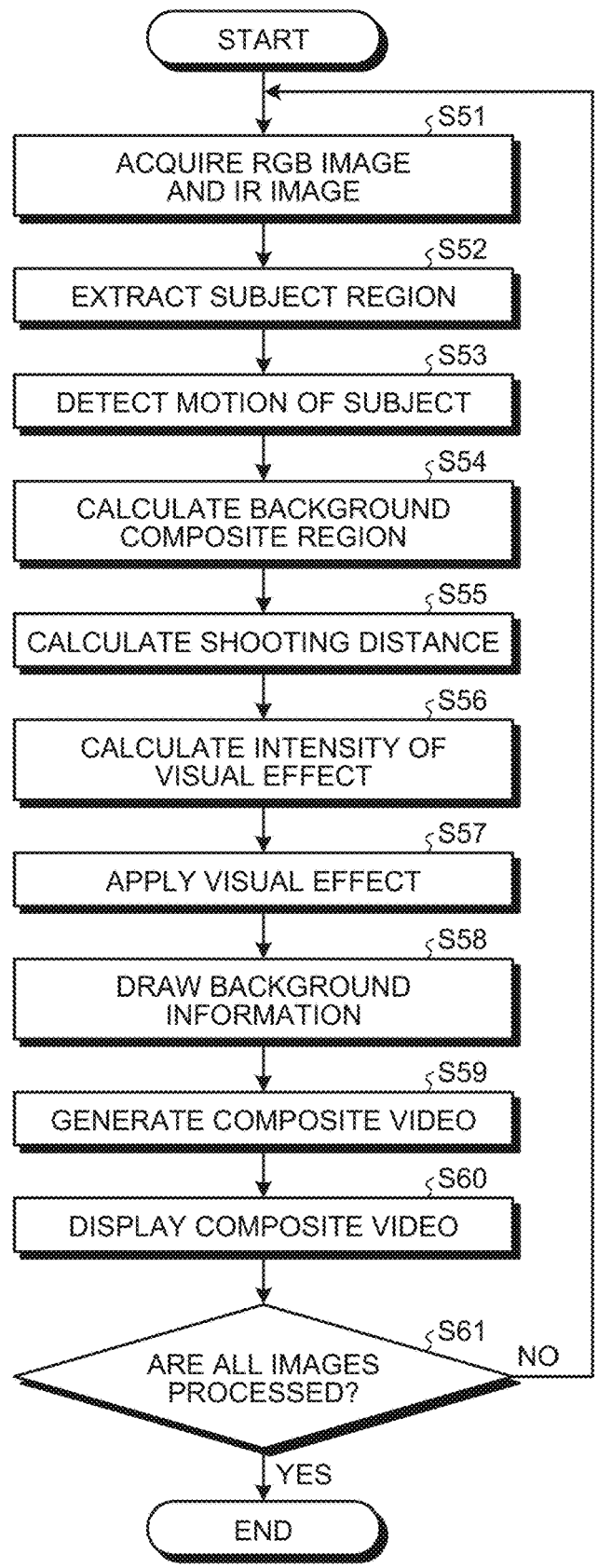
FIG. 18 is a flowchart illustrating an example of a procedure of processing performed by the subject emphasizing device according to the third embodiment.

Next, a procedure of processing performed by the subject emphasizing device 20e will be described with reference to FIG. 18. FIG. 18 is a flowchart illustrating an example of the procedure of the processing performed by the subject emphasizing device according to the third embodiment. Note that the flowchart of FIG. 18 illustrates the procedure of the processing performed after the calibration for acquiring the positional relationship between the RGB camera 12 and the IR camera 13.

The visible-light moving image acquisition unit 31 and the infrared moving image acquisition unit 32 simultaneously acquire the RGB image and the IR image with the IR light 14 on (Step S51).

The subject region extraction unit 33 extracts the region of the subject 92 from the IR image acquired by the infrared moving image acquisition unit 32 (Step S52).

The motion detection unit 46 detects the motion of the subject 92 (Step S53).

The subject compositing position setting unit 47 calculates a region at which the subject 92 is to be combined with the background information 94, that is, a background composite region (Step S54).

Note that Steps S55 to S61 are the same as the procedure from Step S13 to Step S19 described in the first embodiment (see FIG. 9), and thus description thereof is omitted.

[3-3. Effects of Third Embodiment]

As described above, according to the subject emphasizing device 20e (information processing device) of the third embodiment, the subject compositing position setting unit 47 (compositing position setting unit) sets, on the basis of the motion of the subject 92 detected by the motion detection unit 46, a region in which the region of the subject 93 to which the visual effect is applied by the effect application unit 36 is to be combined with the background information 94 drawn by the background drawing unit 37.

This configuration makes it possible to determine the position of the subject 92 to be combined with the background information 94 by simple processing, when the subject 92 has a motion. In particular, it is possible to reduce the processing time required to detect the region of the subject 92, for high-speed processing.

Although the present disclosure has been described according to several embodiments, these embodiments may be implemented by any device. The device preferably has a necessary functional block to obtain necessary information.

Furthermore, for example, the respective steps of one flowchart may be performed by one device, or may be performed by a plurality of devices. Furthermore, when a single step includes a plurality of processes, the plurality of processes may be performed by one device, or may be performed by a plurality of devices. In other words, the plurality of processes included in the single step can also be performed as a process including a plurality of steps. Conversely, a process described as a plurality of steps can be collectively performed as a single step.

Furthermore, for example, in a program executed by the computer, the processing of steps of describing the program may be executed in chronological order along the description in the present description, may be executed in parallel, or may be executed individually at necessary timing such as calling. In other words, the processing of the respective steps may be executed in an order different from the above-described order within a consistent range. Furthermore, the processing of steps of describing the program may be executed in parallel with or in combination with the processing of another program.

Furthermore, for example, each of a plurality of present technologies described in the present specification may be implemented as a single technology independently as long as there is no contradiction. As a matter of course, a plurality of arbitrary present technologies may be implemented in combination with each other. For example, part or whole of the present technology described in any of the embodiments may be implemented in combination with part or whole of the present technology described in another embodiment. Furthermore, part or whole of any of the present technologies described above may be implemented in combination with another technology which is not described above.

It should be noted that the effects described herein are merely examples, and the present invention is not limited to these effects and may have other effects. The embodiments of the present disclosure are not limited to the embodiments described above, and various modifications and alterations can be made without departing from the spirit and scope of the present disclosure.

Note that the present disclosure can also have the following configurations.

(1)
An information processing device including:
a first acquisition unit that acquires a moving image including a subject and a background;
a subject region extraction unit that extracts a region of the subject from the moving image acquired by the first acquisition unit;
a background drawing unit that draws background information in a region other than the region of the subject in the moving image acquired by the first acquisition unit;
an effect application unit that applies an effect to the region of the subject, based on an intensity of the effect applied to the region of the subject determined according to information about an environment of acquiring the moving image; and
a video compositing unit that generates a composite video in which the region of the subject on which the effect has been applied by the effect application unit is combined with the background information drawn by the background drawing unit.

(2)
The information processing device according to (1), wherein
the effect application unit
applies the effect to the region of the subject based on the intensity of the effect determined according to a shooting distance to the subject.

(3)
The information processing device according to (2), wherein
the effect application unit
when the shooting distance to the subject is shorter than a predetermined distance, increases the intensity of the effect and applies the effect to the region of the subject.

(4)
The information processing device according to any one of (1) to (3), wherein
the effect application unit
when an elapsed time from acquisition of the moving image by the first acquisition unit exceeds a predetermined time, applies the effect to the region of the subject, based on the intensity of the effect determined depending on whether the subject region extraction unit has completed extraction of the region of the subject.

(5)
The information processing device according to (4), wherein
the effect application unit
increases the intensity of the effect and applies the effect to the region of the subject, if the subject region extraction unit has not completed extraction of the region of the subject when the elapsed time exceeds the predetermined time.

(6)
The information processing device according to any one of (1) to (5), further including
a second acquisition unit that acquires an intensity distribution of reflected light of invisible light emitted to the subject, captured at a predetermined relative position from the first acquisition unit, in synchronization with the first acquisition unit,
wherein the subject region extraction unit transforms the region of the subject extracted from the intensity distribution of the reflected light acquired by the second acquisition unit into a shape and position expected to be acquired by the first acquisition unit, applies the region to the moving image actually acquired by the first acquisition unit, and extracts the region of the subject.

(7)
The information processing device according to (6), wherein the invisible light is infrared light.

(8)
The information processing device according to any one of (1) to (7), further including
a video display unit that displays the composite video from the video compositing unit.

(9)
The information processing device according to (8), wherein the video display unit displays the composite video behind the subject.

(10)
The information processing device according to any one of (1) to (9), wherein
the effect application unit applies the effect to an outer periphery of the region of the subject.

(11)
The information processing device according to any one of (1) to (10), wherein the effect application unit
applies the effect according to a maximum value of a displacement between an actual position of the subject and a result of extraction of the subject, predicted based on a moving range of the subject, to the region of the subject.

(12)

The information processing device according to (6) or (7), further including
a switching unit that switches whether to apply the effect or not, according to the number of pixels having brightness equal to or more than a predetermined value in the intensity distribution of the reflected light acquired by the second acquisition unit.

(13)

The information processing device according to any one of (1) to (12), further including
a compositing position setting unit that sets, based on motion of the subject, a region in which the region of the subject to which the effect is applied by the effect application unit is to be combined with the background information drawn by the background drawing unit.

(14)

A composite video generation method including:
a first acquisition step of acquiring a moving image including a subject and a background;
a subject extraction step of extracting a region of the subject from the moving image acquired in the first acquisition step;
a background drawing step of drawing background information in a region other than the region of the subject in the moving image acquired in the first acquisition step;
an effect application step of applying an effect to the region of the subject, based on an intensity of the effect applied to the region of the subject determined according to information about an environment of acquiring the moving image; and
a video compositing step of generating a composite video in which the region of the subject on which the effect has been applied in the effect application step is combined with the background information drawn in the background drawing step.

(15)

A program causing
a computer to function as:
a first acquisition unit that acquires a moving image including a subject and a background;
a subject region extraction unit that extracts a region of the subject from the moving image acquired by the first acquisition unit;
a background drawing unit that draws background information in a region other than the region of the subject in the moving image acquired by the first acquisition unit;
an effect application unit that applies an effect to the region of the subject, based on an intensity of the effect applied to the region of the subject determined according to information about an environment of acquiring the moving image; and
a video compositing unit that generates a composite video in which the region of the subject on which the effect has been applied by the effect application unit is combined with the background information drawn by the background drawing unit.

REFERENCE SIGNS LIST 10a, 10b, 10c, 10d, 10e SUBJECT EMPHASIZING SYSTEM
12 RGB CAMERA (COLOR CAMERA)
13 IR CAMERA (INFRARED CAMERA)
14 IR LIGHT (INFRARED LIGHT)
15 LED PANEL
16 RGB-IR CAMERA
20a, 20b, 20c, 20d, 20e SUBJECT EMPHASIZING DEVICE (INFORMATION PROCESSING DEVICE)
31 VISIBLE-LIGHT MOVING IMAGE ACQUISITION UNIT (FIRST ACQUISITION UNIT)
32 INFRARED MOVING IMAGE ACQUISITION UNIT (SECOND ACQUISITION UNIT)
33, 42 SUBJECT REGION EXTRACTION UNIT
34 SHOOTING DISTANCE CALCULATION UNIT
35 EFFECT INTENSITY CALCULATION UNIT
36 EFFECT APPLICATION UNIT
37 BACKGROUND DRAWING UNIT
38 VIDEO COMPOSITING UNIT
39 DISPLAY CONTROL UNIT (VIDEO DISPLAY UNIT)
40 PARALLAX PREDICTION UNIT
41 MOVING IMAGE ACQUISITION UNIT (FIRST ACQUISITION UNIT AND SECOND ACQUISITION UNIT)
43 PROCESSING TIME MEASUREMENT UNIT
44 TRIGGER INFORMATION DETECTION UNIT
45 EFFECT ON/OFF CONTROL UNIT (SWITCHING UNIT)
46 MOTION DETECTION UNIT
47 SUBJECT COMPOSITING POSITION SETTING UNIT (COMPOSITING POSITION SETTING UNIT)
90 STAGE
92, 93 SUBJECT
94 BACKGROUND INFORMATION
95 COMPOSITE VIDEO
ε PARALLAX

The invention claimed is:

1. An information processing device, including:
a first acquisition unit configured to acquire a moving image of a subject with a background;
a subject region extraction unit configured to extract a region of the subject from the acquired moving image;
a background drawing unit configured to draw background information in a region outside the extracted region of the subject in the moving image;
an effect application unit configured to apply an effect to the region of the subject, wherein an intensity of the effect applied to the region of the subject is based on information about an environment associated with the acquisition of the moving image;
a video compositing unit configured to generate a composite video, wherein the generated composite video includes a combination of the region of the subject with the applied effect and the drawn background information; and
a video display unit configured to display the generated composite video behind the subject.

2. The information processing device according to claim 1, wherein
the effect application unit is further configured to apply the effect to the region of the subject, and
the intensity of the effect is further based on a shooting distance to the subject.

3. The information processing device according to claim 2, wherein the effect application unit is further configured to increase, based on the shooting distance to the subject is shorter than a specific distance, the intensity of the effect and apply the effect to the region of the subject.

4. The information processing device according to claim 1, wherein
the effect application unit is further configured to apply, based on an elapsed time for the acquisition of the moving image exceeds a time, the effect to the region of the subject, and
based on the intensity of the effect determined depending on whether the subject region extraction unit has completed is further based on a completion of the extraction of the region of the subject.

5. The information processing device according to claim 4, wherein the effect application unit is further configured to increase the intensity of the effect and apply the effect to the region of the subject based on a non-completion of the extraction of the region of the subject.

6. The information processing device according to claim 1, further includes a second acquisition unit configured to acquire an intensity distribution of a reflected light of invisible light emitted to the subject, wherein
the intensity distribution is captured at a specific relative position from the first acquisition unit, in synchronization with the first acquisition unit, and
the subject region extraction unit is further configured to transform the region of the subject extracted from the intensity distribution of the reflected light into a shape and a position expected to be acquired by the first acquisition unit, apply the region to the moving image actually acquired by the first acquisition unit, and extracts the region of the subject.

7. The information processing device according to claim 6, wherein the invisible light is infrared light.

8. The information processing device according to claim 1, wherein the effect application unit is further configured to apply the effect to an outer periphery of the region of the subject.

9. The information processing device according to claim 1, wherein
the effect application unit is further configured to apply the effect based on a maximum value of a displacement between an actual position of the subject and a result of extraction of the subject, and
the maximum value of the displacement is predicted based on a moving range of the subject.

10. The information processing device according to claim 6, further including a switching unit configured to apply the effect based on a number of pixels having brightness equal to or more than a specific value in the intensity distribution of the reflected light acquired by the second acquisition unit.

11. The information processing device according to claim 1, further including a compositing position setting unit configured to set, based on motion of the subject, a specific region that includes a combination of the region of the subject with the applied effect and the drawn background information.

12. A composite video generation method, including:
acquiring a moving image of a subject with a background;
extracting a region of the subject from the acquired moving image;
drawing background information in a region outside the region of the subject in the acquired moving image;
applying an effect to the region of the subject, wherein an intensity of the effect applied to the region of the subject is based on information about an environment associated with the acquisition of the moving image;
generating a composite video, wherein the generated composite video includes a combination of the region of the subject, with the applied effect and, the drawn background information; and
displaying the generated composite video behind the subject.

13. A non-transitory computer-readable medium having stored thereon, computer-executable instructions which, when executed by a computer, cause the computer to execute operations, the operations comprising:
acquiring a moving image of a subject with a background;
extracting a region of the subject from the acquired moving image;
drawing background information in region outside the extracted region of the subject in the moving image acquired by the first acquisition unit;
applying an effect to the region of the subject, wherein an intensity of the effect applied to the region of the subject is based on to information about an environment association with the acquisition of the moving image;
generating a composite video, wherein the generated composite video includes a combination of the region of the subject, with the applied effect and, the drawn formation; and
displaying the generated composite video from behind the subject.

* * * * *